(12) United States Patent
Bryant et al.

(10) Patent No.: US 9,063,932 B2
(45) Date of Patent: Jun. 23, 2015

(54) APPARATUS, METHOD AND ARTICLE TO MANAGE ELECTRONIC OR DIGITAL DOCUMENTS IN A NETWORKED ENVIRONMENT

(75) Inventors: Victor Bryant, Covington, GA (US); Igor Poluektov, Roswell, GA (US)

(73) Assignee: Vertafore, Inc., Bothell, WA (US)

( * ) Notice: Subject to any disclaimer, the term of this patent is extended or adjusted under 35 U.S.C. 154(b) by 417 days.

(21) Appl. No.: 12/641,843

(22) Filed: Dec. 18, 2009

(65) Prior Publication Data
US 2011/0153560 A1  Jun. 23, 2011

(51) Int. Cl.
*G06F 17/30* (2006.01)

(52) U.S. Cl.
CPC .... *G06F 17/30011* (2013.01); *G06F 17/30194* (2013.01)

(58) Field of Classification Search
USPC ........................................................ 707/623
See application file for complete search history.

(56) References Cited

U.S. PATENT DOCUMENTS

| | | | |
|---|---|---|---|
| 3,970,992 A | 7/1976 | Boothroyd et al. | |
| 4,346,442 A | 8/1982 | Musmanno | |
| 4,347,568 A | 8/1982 | Giguere et al. | |
| 4,359,631 A | 11/1982 | Lockwood et al. | |
| 4,383,298 A | 5/1983 | Huff et al. | |
| 4,410,940 A | 10/1983 | Carlson et al. | |
| 4,429,360 A | 1/1984 | Hoffman et al. | |
| 4,486,831 A | 12/1984 | Wheatley et al. | |
| 4,491,725 A | 1/1985 | Pritchard | |
| 4,503,499 A | 3/1985 | Mason et al. | |
| 4,553,206 A | 11/1985 | Smutek et al. | |
| 4,567,359 A | 1/1986 | Lockwood | |
| 4,591,974 A | 5/1986 | Dornbush et al. | |
| 4,598,367 A | 7/1986 | DeFrancesco et al. | |
| 4,633,430 A | 12/1986 | Cooper | |
| 4,642,768 A | 2/1987 | Roberts | |
| 4,646,229 A | 2/1987 | Boyle | |
| 4,646,231 A | 2/1987 | Green et al. | |
| 4,646,250 A | 2/1987 | Childress | |
| 4,648,037 A | 3/1987 | Valentino | |
| 4,658,351 A | 4/1987 | Teng | |

(Continued)

FOREIGN PATENT DOCUMENTS

| | | |
|---|---|---|
| CA | 2646167 A1 | 10/2007 |
| CA | 2649441 A1 | 10/2007 |

(Continued)

OTHER PUBLICATIONS

"AMS Real-Time Getting Started Guide," AMS Services, Vertafore, Inc., 9 pages, 2008.

(Continued)

*Primary Examiner* — James Trujillo
*Assistant Examiner* — Kurt Mueller
(74) *Attorney, Agent, or Firm* — Seed IP Law Group PLLC

(57) ABSTRACT

Systems and methods of electronic or digital document management allow satellite offices, sites or facilities to replicate some documents in a shared or common electronic document repository, while storing other documents only locally, while allowing document management functions seamlessly across an enterprise independent of whether the electronic or digital documents or files are replicated to a shared or common repository, for instance a central electronic or digital document repository.

15 Claims, 8 Drawing Sheets

(56) References Cited

U.S. PATENT DOCUMENTS

| | | |
|---|---|---|
| 4,730,252 A | 3/1988 | Bradshaw |
| 4,794,515 A | 12/1988 | Hornung |
| 4,809,170 A | 2/1989 | Leblang et al. |
| 4,819,156 A | 4/1989 | DeLorme et al. |
| 4,831,526 A | 5/1989 | Luchs et al. |
| 4,845,644 A | 7/1989 | Anthias et al. |
| 4,860,247 A | 8/1989 | Uchida et al. |
| 4,912,628 A | 3/1990 | Briggs |
| 4,918,588 A | 4/1990 | Barrett et al. |
| 4,928,243 A | 5/1990 | Hodges et al. |
| 4,928,252 A | 5/1990 | Gabbe et al. |
| 4,949,251 A | 8/1990 | Griffin et al. |
| 4,951,194 A | 8/1990 | Bradley et al. |
| 4,959,769 A | 9/1990 | Cooper et al. |
| 4,985,831 A | 1/1991 | Dulong et al. |
| 5,072,412 A | 12/1991 | Henderson, Jr. et al. |
| 5,086,502 A | 2/1992 | Malcolm |
| 5,159,669 A | 10/1992 | Trigg et al. |
| 5,161,226 A | 11/1992 | Wainer |
| 5,170,480 A | 12/1992 | Mohan et al. |
| 5,175,853 A | 12/1992 | Kardach et al. |
| 5,201,033 A | 4/1993 | Eagen et al. |
| 5,220,665 A | 6/1993 | Coyle, Jr. et al. |
| 5,241,677 A | 8/1993 | Naganuma et al. |
| 5,257,375 A | 10/1993 | Clark et al. |
| 5,261,099 A | 11/1993 | Bigo et al. |
| 5,263,134 A | 11/1993 | Paal et al. |
| 5,265,159 A | 11/1993 | Kung |
| 5,282,052 A | 1/1994 | Johnson et al. |
| 5,317,733 A | 5/1994 | Murdock |
| 5,363,214 A | 11/1994 | Johnson |
| 5,448,729 A | 9/1995 | Murdock |
| 5,517,644 A | 5/1996 | Murdock |
| 5,530,861 A | 6/1996 | Diamant et al. |
| 5,537,315 A | 7/1996 | Mitcham |
| 5,553,282 A | 9/1996 | Parrish et al. |
| 5,583,922 A | 12/1996 | Davis et al. |
| 5,634,052 A | 5/1997 | Morris |
| 5,864,340 A | 1/1999 | Bertram et al. |
| 5,880,724 A | 3/1999 | Bertram et al. |
| 5,968,125 A | 10/1999 | Garrick et al. |
| 6,049,877 A | 4/2000 | White |
| 6,065,026 A | 5/2000 | Cornelia et al. |
| 6,128,653 A | 10/2000 | del Val et al. |
| 6,199,079 B1 | 3/2001 | Gupta et al. |
| 6,240,416 B1 * | 5/2001 | Immon et al. ............ 1/1 |
| 6,247,020 B1 | 6/2001 | Minard |
| 6,271,846 B1 | 8/2001 | Martinez et al. |
| 6,272,678 B1 | 8/2001 | Imachi et al. |
| 6,301,592 B1 | 10/2001 | Aoyama et al. |
| 6,366,920 B1 | 4/2002 | Hoose et al. |
| 6,377,948 B2 | 4/2002 | Kikuchi et al. |
| 6,381,744 B2 | 4/2002 | Nanos et al. |
| 6,385,642 B1 | 5/2002 | Chlan et al. |
| 6,393,407 B1 | 5/2002 | Middleton, III et al. |
| 6,405,238 B1 | 6/2002 | Votipka |
| 6,407,752 B1 | 6/2002 | Harnett |
| 6,430,575 B1 | 8/2002 | Dourish et al. |
| 6,437,803 B1 | 8/2002 | Panasyuk et al. |
| 6,463,343 B1 | 10/2002 | Emens et al. |
| 6,490,601 B1 | 12/2002 | Markus et al. |
| 6,510,430 B1 | 1/2003 | Oberwager et al. |
| 6,538,667 B1 | 3/2003 | Duursma et al. |
| 6,546,405 B2 | 4/2003 | Gupta et al. |
| 6,592,629 B1 * | 7/2003 | Cullen et al. ............ 715/205 |
| 6,601,047 B2 | 7/2003 | Wang et al. |
| 6,658,167 B1 | 12/2003 | Lee et al. |
| 6,658,659 B2 | 12/2003 | Hiller et al. |
| 6,915,435 B1 | 7/2005 | Merriam |
| 6,918,082 B1 | 7/2005 | Gross et al. |
| 6,978,376 B2 | 12/2005 | Giroux et al. |
| 6,993,529 B1 | 1/2006 | Basko et al. |
| 6,993,661 B1 | 1/2006 | Garfinkel |
| 7,010,503 B1 | 3/2006 | Oliver et al. |
| 7,020,779 B1 | 3/2006 | Sutherland |
| 7,146,495 B2 | 12/2006 | Baldwin et al. |
| 7,178,110 B2 | 2/2007 | Fujino |
| 7,206,998 B2 | 4/2007 | Pennell et al. |
| 7,266,537 B2 | 9/2007 | Jacobsen et al. |
| 7,299,202 B2 | 11/2007 | Swanson |
| 7,299,502 B2 | 11/2007 | Schmeling et al. |
| 7,318,193 B2 | 1/2008 | Kim et al. |
| 7,321,539 B2 | 1/2008 | Ballantyne |
| 7,322,025 B2 | 1/2008 | Reddy et al. |
| 7,372,789 B2 | 5/2008 | Kuroda |
| 7,421,438 B2 | 9/2008 | Turski et al. |
| 7,440,967 B2 | 10/2008 | Chidlovskii |
| 7,574,048 B2 | 8/2009 | Shilman et al. |
| 7,584,196 B2 * | 9/2009 | Reimer et al. ............ 1/1 |
| 7,587,327 B2 | 9/2009 | Jacobs et al. |
| 7,593,532 B2 | 9/2009 | Plotkin et al. |
| 7,624,189 B2 * | 11/2009 | Bucher ............ 709/229 |
| 7,636,898 B2 | 12/2009 | Takahashi |
| 7,650,320 B2 | 1/2010 | Nakano |
| 7,676,792 B2 | 3/2010 | Irie et al. |
| 7,698,230 B1 | 4/2010 | Brown et al. |
| 7,757,168 B1 | 7/2010 | Shanahan et al. |
| 7,949,711 B2 * | 5/2011 | Chang et al. ............ 709/205 |
| 7,996,759 B2 | 8/2011 | Elkady |
| 8,140,589 B2 | 3/2012 | Petri |
| 8,166,388 B2 | 4/2012 | Gounares et al. |
| 8,370,403 B2 | 2/2013 | Matsuki |
| 8,438,045 B2 | 5/2013 | Erlanger |
| 8,458,582 B2 | 6/2013 | Rogers et al. |
| 8,650,043 B1 | 2/2014 | Phillips |
| 2001/0027420 A1 | 10/2001 | Boublik et al. |
| 2001/0032092 A1 | 10/2001 | Calver |
| 2002/0065879 A1 | 5/2002 | Ambrose et al. |
| 2002/0120474 A1 | 8/2002 | Hele et al. |
| 2002/0138476 A1 | 9/2002 | Suwa et al. |
| 2002/0194033 A1 | 12/2002 | Huff |
| 2002/0194578 A1 | 12/2002 | Irie et al. |
| 2002/0198743 A1 | 12/2002 | Ariathurai et al. |
| 2003/0101200 A1 * | 5/2003 | Koyama et al. ............ 707/200 |
| 2003/0144887 A1 | 7/2003 | Debber |
| 2003/0191938 A1 | 10/2003 | Woods et al. |
| 2003/0212610 A1 | 11/2003 | Duffy et al. |
| 2004/0039757 A1 | 2/2004 | McClure |
| 2004/0059740 A1 | 3/2004 | Hanakawa et al. |
| 2004/0128182 A1 | 7/2004 | Pepoon et al. |
| 2004/0186750 A1 | 9/2004 | Surbey et al. |
| 2004/0193455 A1 | 9/2004 | Kellington |
| 2004/0236614 A1 | 11/2004 | Keith |
| 2004/0267578 A1 | 12/2004 | Pearson |
| 2005/0071203 A1 | 3/2005 | Maus |
| 2005/0080804 A1 | 4/2005 | Bradshaw, Jr. et al. |
| 2005/0097061 A1 | 5/2005 | Shapiro et al. |
| 2005/0137928 A1 | 6/2005 | Scholl et al. |
| 2005/0144195 A1 | 6/2005 | Hesselink et al. |
| 2005/0185636 A1 * | 8/2005 | Bucher ............ 370/352 |
| 2006/0100912 A1 | 5/2006 | Kumar et al. |
| 2006/0184452 A1 | 8/2006 | Barnes et al. |
| 2006/0195491 A1 | 8/2006 | Nieland et al. |
| 2006/0195494 A1 | 8/2006 | Dietrich |
| 2006/0259524 A1 | 11/2006 | Horton |
| 2007/0006222 A1 | 1/2007 | Maier et al. |
| 2007/0016465 A1 | 1/2007 | Schaad |
| 2007/0061154 A1 | 3/2007 | Markvoort et al. |
| 2007/0067772 A1 | 3/2007 | Bustamante |
| 2007/0146823 A1 * | 6/2007 | Borchers et al. ............ 358/496 |
| 2007/0186214 A1 | 8/2007 | Morgan |
| 2007/0244921 A1 | 10/2007 | Blair |
| 2007/0244935 A1 | 10/2007 | Cherkasov |
| 2007/0245230 A1 | 10/2007 | Cherkasov |
| 2007/0282927 A1 * | 12/2007 | Polouetkov ............ 707/204 |
| 2008/0002830 A1 | 1/2008 | Cherkasov et al. |
| 2008/0040690 A1 | 2/2008 | Sakai |
| 2008/0091846 A1 | 4/2008 | Dang |
| 2008/0177839 A1 * | 7/2008 | Chang et al. ............ 709/205 |
| 2009/0055242 A1 | 2/2009 | Rewari et al. |
| 2009/0119133 A1 | 5/2009 | Yeransian et al. |
| 2009/0287746 A1 | 11/2009 | Brown |
| 2009/0328171 A1 * | 12/2009 | Bayus et al. ............ 726/7 |
| 2010/0060926 A1 | 3/2010 | Smith et al. ............ 358/1.15 |

(56) References Cited

U.S. PATENT DOCUMENTS

| | | | |
|---|---|---|---|
| 2010/0064230 A1 | 3/2010 | Klawitter et al. | 715/748 |
| 2010/0064258 A1 | 3/2010 | Gorczowski et al. | 715/841 |
| 2010/0064375 A1 | 3/2010 | Gorczowski et al. | 726/28 |
| 2010/0076993 A1 | 3/2010 | Klawitter et al. | 707/769 |
| 2010/0091317 A1 | 4/2010 | Williams et al. | 358/1.15 |
| 2010/0161616 A1 | 6/2010 | Mitchell | |
| 2010/0179883 A1* | 7/2010 | Devolites | 705/26 |
| 2010/0191785 A1* | 7/2010 | Serlet et al. | 707/827 |
| 2011/0145037 A1 | 6/2011 | Domashchenko et al. | |
| 2011/0153560 A1 | 6/2011 | Bryant et al. | |
| 2011/0161375 A1 | 6/2011 | Tedder et al. | 707/803 |
| 2011/0173153 A1 | 7/2011 | Domashchenko et al. | |
| 2011/0184766 A1 | 7/2011 | Virdhagriswaran | |
| 2011/0283177 A1 | 11/2011 | Gates et al. | |
| 2012/0150919 A1 | 6/2012 | Brown et al. | |
| 2012/0232934 A1 | 9/2012 | Zhang et al. | |
| 2012/0271657 A1 | 10/2012 | Anderson et al. | |
| 2013/0024418 A1 | 1/2013 | Sitrick et al. | |
| 2013/0073942 A1 | 3/2013 | Cherkasov | |

FOREIGN PATENT DOCUMENTS

| | | | |
|---|---|---|---|
| CA | 2761405 A1 | 6/2012 | |
| CA | 2733857 A1 | 9/2012 | |
| CA | 2737734 A1 | 10/2012 | |
| EP | 0585192 A1 | 3/1994 | |
| JP | 60-41138 A | 3/1985 | |
| JP | 3-282941 A | 12/1991 | |
| JP | 4-373026 A | 12/1992 | |
| WO | 2007/120771 A2 | 10/2007 | |
| WO | 2007/120772 A2 | 10/2007 | |
| WO | 2007/120773 A2 | 10/2007 | |
| WO | 2007/120774 A2 | 10/2007 | |
| WO | 2010/030675 | 3/2010 | |
| WO | 2010/030676 | 3/2010 | |
| WO | 2010/030677 | 3/2010 | |
| WO | 2010/030678 | 3/2010 | |
| WO | 2010/030679 | 3/2010 | |
| WO | 2010/030680 | 3/2010 | |

OTHER PUBLICATIONS

Announcement, "Coming Attraction, AMS Invites you to a Special Sneak Preview," AMS Services, 1 page, Aug. 1, 2008.

Brochure, "AMS 360—Business Growth. Productivity. Proven Technology.," Vertafore, Inc., 8 pages, 2008.

Corriveau et al., "AMS Portal Server: Bridging the Gap Between Web Presentation and the Back Office," White Paper, AMS Services, 13 pages, 2008.

"VERITAS Replication Exec version 3.1 for Windows," Administrator's Guide, pp. i-20, 49-68, and 119-160, Dec. 2004.

"Update insurance template according to changes in policy," retrieved from https://www.google.com/?tbm=pts, on Sep. 24, 2012, 2 pages.

"Adobe Introduces Adobe Acrobat 3.0 Software," *PR Newswire*, Jun. 3, 1996, 3 pages.

"CoreData Inc. Announces Technology and Marketing Agreement with MobileStar Network Corp.," *Business Wire*, Aug. 26, 1998, 2 pages.

"CoreData Offers E-mail Connectivity for RemoteWorx," *Newsbytes News Network*, Sep. 18, 1998, 1 page.

"Free Sticky Notes software—Sticky Notes program MoRUN.net Sticker Lite," Jan. 11, 2006, retrieved from http://web.archive.org/web/20060112031435/http://www.sticky-notes.net/free/stickynotes.html, on Oct. 10, 2013, 2 pages.

"Internet lifts servers to 64 bits," *Electronic Engineering Times*, Dec. 23, 1996, 3 pages.

"NotesPlusPlus," Feb. 25, 2006, retrieved from http://web.archive.org/web/20060225020405/http://www.sharewareconnection.com/notesplusplus.htm, on Oct. 10, 2013, 2 pages.

"SPSS Unveils Aggressive Development Plans: 1999 Product Releases Will Focus on Scalability and Deployment Solutions for the Enterprise," *Business Wire*, Feb. 18, 1999, 3 pages.

"Windows XP: The Complete Reference: Using Files and Folders," Apr. 28, 2004, retrieved from http://web.archive.org/web/20040428222156/http://delltech.150m.com/XP/files/7.htm, on Oct. 10, 2013, 4 pages.

Brown et al., "Agency Management System and Content Management System Integration," U.S. Appl. No. 61/422,090, filed Dec. 10, 2010, 54 pages.

Extended European Search Report, dated Jul. 9, 2012, for Application No. 07755347.7, 8 pages.

Extended European Search Report, dated Jun. 14, 2012, for Application No. 07755348.5, 8 pages.

Extended European Search Report, dated Jun. 19, 2012, for Application No. 07755349.3, 8 pages.

Extended European Search Report, dated Jun. 14, 2012, for Application No. 07755350.1, 9 pages.

Fogel, "Open Source Development With CVS," Copyright 1999, 2000, retrieved from http://web.archive.org/web/20000815211634/http://cvsbook.red-bean.com/cvsbook.ps, on Oct. 10, 2013, 218 pages.

Gadia, "A Homogeneous Relational Model and Query Languages for Temporal Databases," *ACM Transactions on Database Systems* 13(4):418-448, Dec. 1988.

Gage, "Sun's 'objective' is to populate Java networks," *Computer Reseller News*, Apr. 15, 1996, p. 69, 2 pages.

International Search Report and Written Opinion, mailed Aug. 5, 2008, for PCT/US2007/009040, 7 pages.

International Search Report and Written Opinion, mailed Jul. 18, 2008, for PCT/US2007/009041, 8 pages.

International Search Report and Written Opinion, mailed Jul. 14, 2008, for PCT/US2007/009042, 6 pages.

International Search Report and Written Opinion, mailed Jul. 18, 2008, for PCT/US2007/009043, 9 pages.

Murdock, "Office Automation System for Data Base Management and Forms Generation," U.S. Appl. No. 07/471,290, filed Jan. 26, 1990, 163 pages.

Snodgrass et al., "Temporal Databases," IEEE Computer, Sep. 1986, pp. 35-42.

Snyder et al., "Apparatus, Method and Article to Automate and Manage Communications in a Networked Environment," U.S. Appl. No. 13/451,139, filed Apr. 19, 2012, 70 pages.

Snyder et al., "Apparatus, Method and Article to Automate and Manage Communications to Multiple Entities in a Networked Environment," U.S. Appl. No. 13/451,168, filed Apr. 19, 2012, 82 pages.

Snyder et al., "Apparatus, Method and Article to Automate and Manage Electronic Documents in a Networked Environment," U.S. Appl. No. 13/451,136, filed Apr. 19, 2012, 80 pages.

Snyder et al., "Apparatus, Method and Article to Provide an Insurance Workflow Management System," U.S. Appl. No. 13/598,297, filed Aug. 29, 2012, 86 pages.

Alvarez, "Bit Level Comparator Systems and Methods," U.S. Appl. No. 14/101,905, filed Dec. 10, 2013, 57 pages.

Sinyagin et al., "Integration Testing Method and System for Web Services," U.S. Appl. No. 14/104,749, filed Dec. 12, 2013, 63 pages.

Non-final Office Action mailed Feb. 3, 2012, in U.S. Appl. No. 12/647,235, 20 pages.

Amendment filed May 3, 2012, in U.S. Appl. No. 12/647,235, 16 pages.

Final Office Action mailed Jul. 10, 2012, in U.S. Appl. No. 12/647,235, 20 pages.

Amendment filed Sep. 10, 2012, in U.S. Appl. No. 12/647,235, 21 pages.

\* cited by examiner

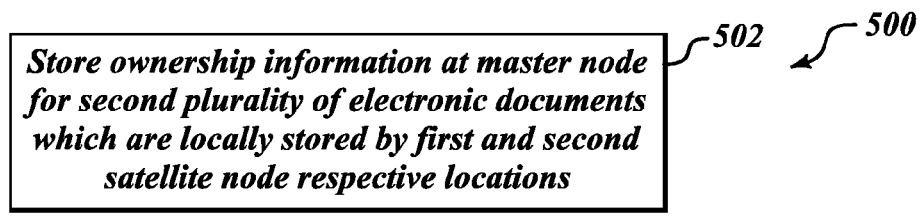
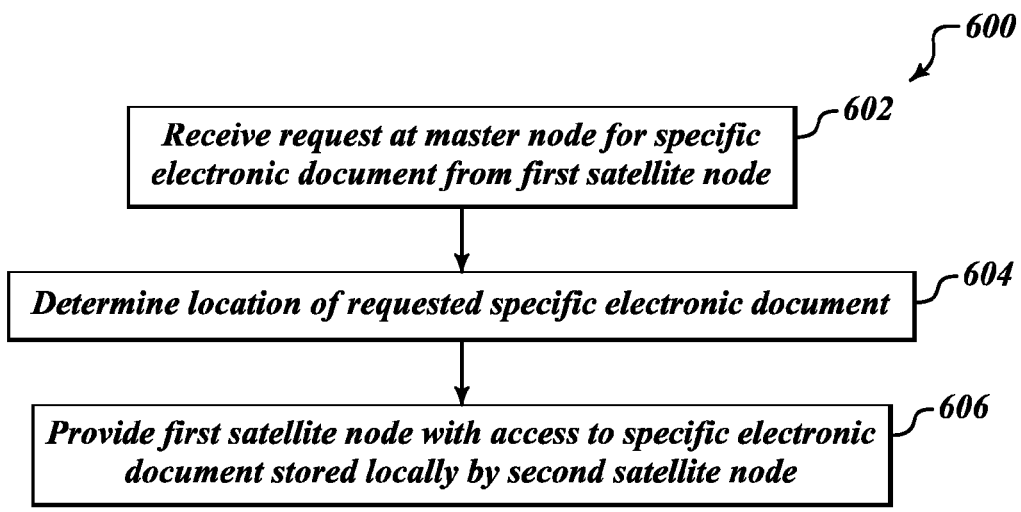
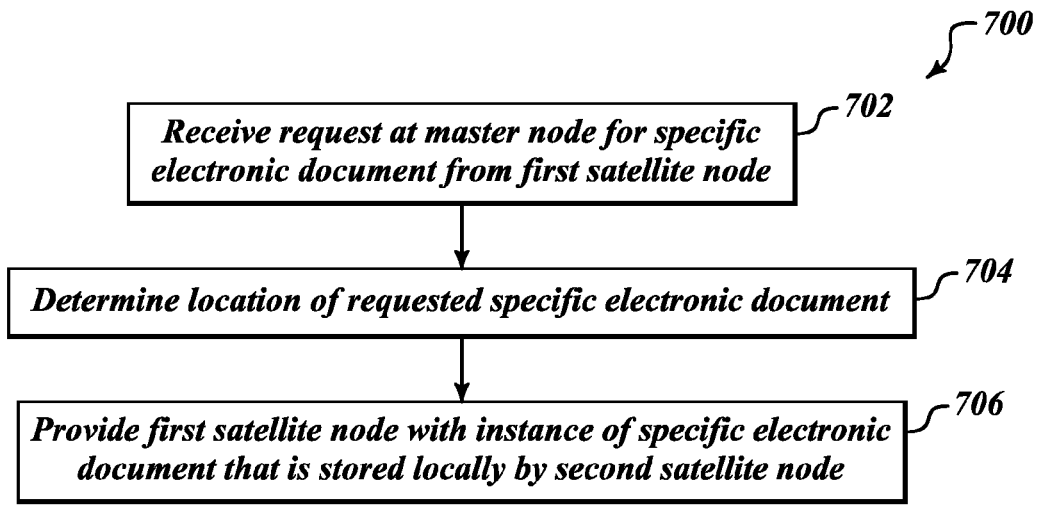

APPARATUS, METHOD AND ARTICLE TO MANAGE ELECTRONIC OR DIGITAL DOCUMENTS IN A NETWORKED ENVIRONMENT

BACKGROUND

1. Technical Field

The present disclosure generally relates to networked systems, and in particular document management systems in networked environments that manage electronic or digital documents or files owned by various entities.

2. Description of the Related Art

Many commercial, government and/or non-profit entities have multiple offices, sites or facilities which may be geographically dispersed around a city, state, province, country or even around the World. These offices, sites or facilities are typically communicatively coupled by one or more communications networks. Such allows for enterprise wide communications between the various offices, sites or facilities, including the sharing or exchange of electronic or digital documents or files.

Many such enterprise wide networks employ a document management system. The document management system often provides centralized storage or replication of electronic or digital documents or files for multiple offices, sites or facilities. Typically, such document management systems will employ a number of satellite servers or nodes to provide local users at remote offices, sites or facilities with access to the centrally stored electronic or digital documents or files.

Many document management systems employ an ownership scheme to limit or control which entities are able to perform certain actions (e.g., read, modify or edit, delete) on the electronic or digital documents or to authorize other entities to perform such actions. Thus, for example, an owner of a given electronic or digital document may be allowed to read, modify or delete that electronic or digital document. Further, the owner of a given electronic or digital document may have the ability to authorize other entities to read, modify or delete that electronic or digital document. Ownership may be logically associated with a satellite office, site or facility level, where a given satellite office, site or facility is the owner of one or more electronic or digital documents and thus has the rights, permission, privileges and/or authority of an owner with respect to those electronic or digital documents. Alternatively, or additionally, ownership may be logically associated with an individual user, wherein a given individual user is assigned as the owner of one or more electronic or digital documents or files and has the rights, permission, privileges and/or authority of an owner with respect to those electronic or digital documents. Ownership is typically restricted to a single satellite office, site or facility, or in some document management systems to a single individual user.

Such networked document management systems must be able to provide access to a most recent version of an electronic or digital document. However, such may be difficult, particularly in a multi-user environment in which ownership or authority to perform an action (e.g., read, modify or edit, delete) on a particular electronic or digital document may be shared or may change over time. Such difficulty may be exacerbated where a local or satellite office, site or facility may temporarily be unable to communicate with the central server or node, a situation commonly referred to as being "off-line."

As an example of a typical scenario, a first electronic or digital document may be create by a first user associated with a first remote satellite office. The ownership with respect to the first electronic or digital document will typically default to the entity associated with the creation of the document, in this case the first remote satellite office or first user. A document management system may store or replicate the first electronic or digital document to a central storage device. If a second user associated with a second satellite office wishes to simply read the first electronic or digital document, then the second satellite office or second user only needs permission to read such, where the read permission is granted by the owner of the first electronic or digital document. Read access to the centrally stored or replicated copy of the first electronic or digital document is provided to the second user. However, if the second user associated with the second satellite office wishes to modify the first electronic or digital document, the document management system may require changing the ownership of the first electronic or digital document to the second satellite office or second user. If ownership is changed, the second user receives all the rights, permission, privileges or authority of the owner with respect to the centrally stored or replicated copy of the first electronic or digital document. Centralized storage or replication of all electronic or digital documents tends to be cornerstone of conventional document management systems.

BRIEF SUMMARY

More flexible approaches to electronic or digital document management are desirable. Particularly desirable are approaches that accommodate the specific needs of various individual offices, sites or facilities, while maintaining file management and delivery across an entire enterprise.

A method of managing electronic documents shared across networked satellite nodes remotely located from one another may be summarized as including storing a first plurality of electronic documents in a common electronic document repository where the first plurality of electronic documents includes electronic documents owned by at least two different owners remotely located from one another; storing ownership information at a master node for the first plurality of electronic documents stored in the common electronic document repository, wherein the ownership information indicates that at least one of the electronic documents of the first plurality of electronic documents is owned by a first owner of the at least two different owners and at least one of the electronic documents of the first plurality of electronic documents is owned by a second owner of the at least two different owners, the second owner different from and remotely located with respect to the first owner; and storing ownership information at the master node for a second plurality of electronic documents which are locally stored by at least one satellite node at a respective location remote from the common electronic repository, wherein the ownership information stored at the master node for the first and the second plurality of electronic documents indicates for each electronic document a logical entity that has authority to authorize changes to the respective electronic document. Storing ownership information at the master node for a second plurality of electronic documents which are locally stored by at least one satellite node at a respective location remote from the common electronic repository may include storing ownership information at the master node for the second plurality of electronic documents which are locally stored by a first and at least a second satellite node at a first and a second location, respectively, the first and the second locations located remotely from one another.

The method may further include storing ownership information at the master node for a third plurality of electronic documents which are locally stored by the master node separately from the common electronic repository.

The method may further include providing at least one satellite node with access to at least one electronic document that is stored locally by another satellite node.

The method may further include receiving a request at the master node for a specific electronic document from a first satellite node; determining a location of the requested specific electronic document; and providing the first satellite node with access to the specific electronic document that is stored locally by a second satellite node remote from the first satellite node and remote from the common electronic document repository.

The method may further include receiving a request at the master node for a specific electronic document from a first satellite node; determining a location of the requested specific electronic document; and providing the first satellite node with an instance of the specific electronic document that is stored locally by a second satellite node remote from the first satellite node and remote from the common electronic document repository. Storing a first plurality of electronic documents in a common electronic document repository may include replicating a number of electronic documents from the satellite nodes to the common electronic document repository. Storing a first plurality of electronic documents in a common electronic document repository may include replicating at least one change to at least one of the electronic documents from at least one of the satellite nodes to the common electronic document repository.

The method may further include determining that an author of the changes is at least one of the owner of the electronic document or an authorized entity that has been authorized by the owner of the electronic document before replicating the at least one change.

A document management system may be summarized as including a common electronic document repository that includes at least one storage medium that stores electronic documents from a number of satellite nodes, at least some of the satellite nodes remotely located from each other; a master node that includes at least one processor and that stores ownership information for each electronic document stored by the common electronic document repository and that stores ownership information for a number of electronic documents stored locally by the satellite nodes and not stored at the common electronic document repository, the master node configured to replicate some of the electronic documents to the common electronic document repository and to not replicate other ones of the electronic documents to the common electronic document repository which electronic documents are only stored locally by the satellite nodes. The master node may store ownership information for a number of the electronic documents which are locally stored by a first satellite node at a first location and a number of the electronic documents which are locally stored by a second satellite node at a second location, the first and the second locations located remotely from one another and from the common electronic document repository.

The master node may be further configured to provide at least one of the satellite nodes with access to at least one electronic document that is stored locally by another one of the satellite nodes.

The master node may be further configured to receive a request at the master node from the first satellite node for a specific electronic document; provide the first satellite node with access to at least an instance of the specific electronic document from the common electronic document repository if the specific electronic document is replicated in the common electronic document repository; and provide the first satellite node with access to at least an instance of the specific electronic document from a local satellite repository of the second satellite node if the specific electronic document is not replicated in the common electronic document repository.

The master node may be further configured to replicate a change to one of the electronic documents only if an author of the change to the electronic document is at least one of the owner of the electronic document or an authorized entity that has been authorized by the owner of the electronic document.

At least one computer-readable storage medium may store instructions executable by at least one processor to manage digital files between a hub node and various networked satellite nodes, by storing ownership information by the hub node for a first number of digital files which are replicated in a common digital file repository and for at least a second number of digital files which are stored by a first satellite node in a first satellite node digital file repository and not replicated in the common digital file repository; serving requested ones of the digital files from the hub node to a second satellite node including at least one of the digital files replicated in the common digital file repository and at least one of the digital files stored in the first satellite node digital file repository and not replicated in the common electronic file repository.

The least one computer-readable storage medium may store instructions executable by the at least one processor to manage digital files between the hub node and the networked satellite nodes, further by replicating selected ones of a plurality of digital files created at the first satellite node to the common digital file repository.

The least one computer-readable storage medium may store instructions executable by the at least one processor to manage digital files between the hub node and the networked satellite nodes, further by replicating changes to selected ones of a plurality of digital files created at the first satellite node to the common digital file repository.

The least one computer-readable storage medium may store instructions executable by the at least one processor to manage digital files between the hub node and the networked satellite nodes, further by updating ownership information for selected ones of the first and the second number of digital files.

The least one computer-readable storage medium may store instructions executable by the at least one processor to manage digital files between the hub node and the networked satellite nodes, further by for each of the requested ones of the digital files, determining that the second satellite node that is requesting the requested digital file has authority to modify the requested digital files before serving the requested digital file to the second satellite node.

A method of operating a first satellite node in a networked hub and spoke system may be summarized as including causing at least a first number of digital files to be replicated in a common digital file repository which includes digital files from at least one other satellite node; saving at least a second number of digital files in a local first satellite node repository without replication to the common digital file repository; and receiving at least one digital file from a second satellite node repository of a second node of the networked hub and node system via a hub node of the networked hub and spoke system.

The method may further include providing ownership information to the hub node of the networked hub and spoke system for a number of digital files owned by the first satellite node of the networked hub and spoke system and replicated in the common digital file repository; and providing ownership information to the hub node of the networked hub and spoke system for a number of digital files owned by the first satellite node of the networked hub and spoke system and stored in the local first satellite node repository without replication in the common digital file repository.

The method may further include providing at least one change to the hub node of the networked hub and spoke system for one of the digital files owned by the first satellite node of the networked hub and spoke system and replicated in the common digital file repository.

The method may further include providing authorization for at least one other satellite node to modify one of the digital files owned by the first satellite node of the networked hub and spoke system and replicated in the common digital file repository.

The method may further include providing authorization for at least one other satellite node to modify one of the digital files owned by the first satellite node of the networked hub and spoke system and stored in the local first satellite node repository without replication in the common digital file repository.

The method may further include providing information to the hub node of the networked hub and spoke system indicating a change in ownership of one of the digital files from the first satellite node to the second satellite node of the networked hub and spoke system.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 5 is a flow diagram showing a method of storing ownership information by a master node, according to one illustrated embodiment.

FIG. 6 is a flow diagram showing a method of providing access to a requested electronic or digital document or file, according to one illustrated embodiment.

FIG. 7 is a flow diagram showing a method of providing access to a requested electronic or digital document or file, according to another illustrated embodiment.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computer systems, server computers, and/or communications networks have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

This disclosure describes various systems, methods and articles related to electronic commerce and in particular evaluation of affiliates in electronic commerce. While specific structures and acts associated with particular illustrated embodiments are disclosed, other structures and acts may be employed in other embodiments.

Figure 1:
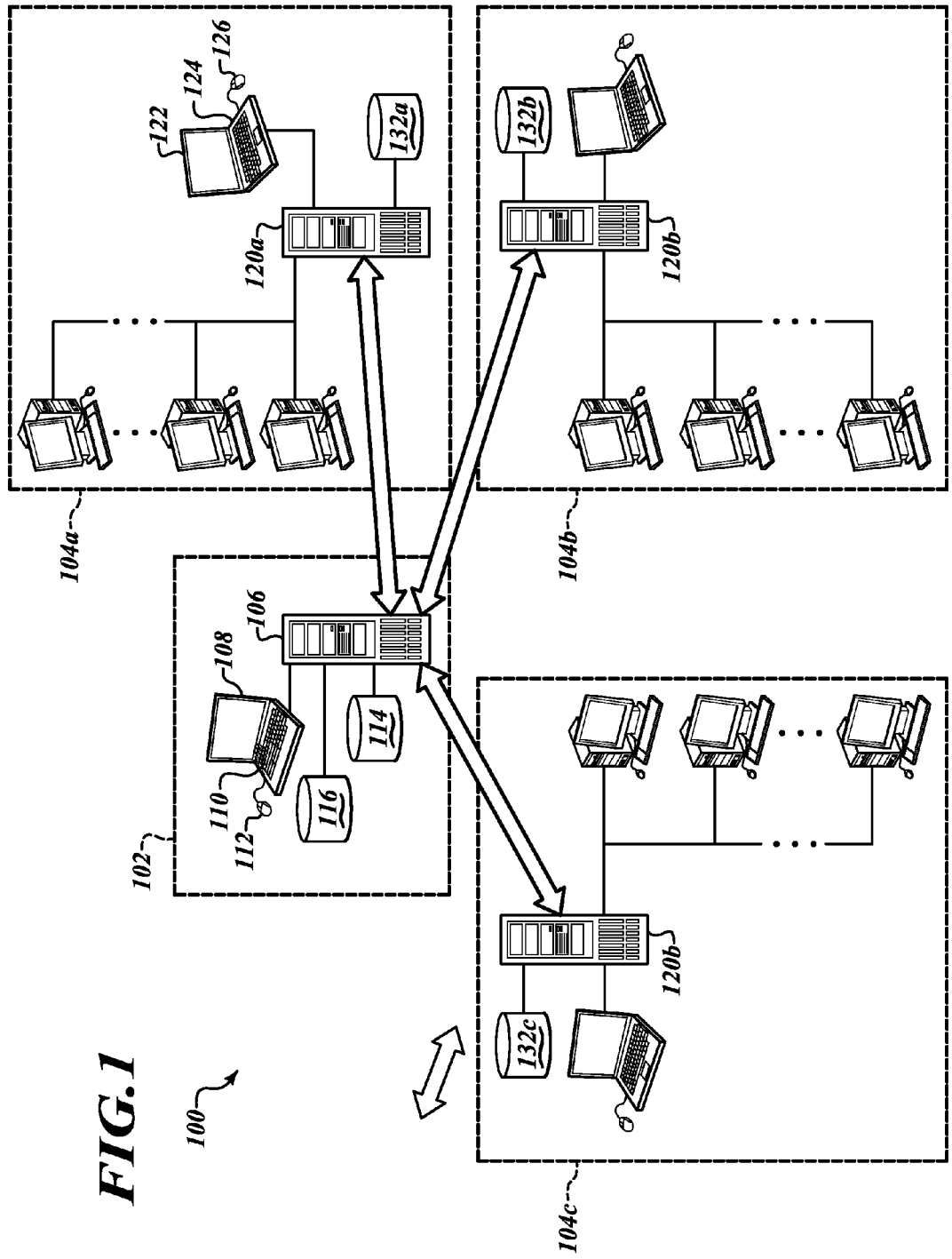
FIG. 1 is a schematic view of a networked document management environment according to one illustrated embodiment, the networked document management environment including at least one master node and common electronic document repository and a number of satellite nodes at least some of which include local document repositories.

FIG. 1 shows a networked electronic or digital document or file management environment 100, according to one illustrated embodiment.

The networked electronic document management environment 100 includes at least one master node 102 (only one illustrated), and a number of satellite nodes 104a-104c (collectively 104, only three illustrated).

The master node 102 may, for example, be a main document storage facility, located at or associated with a main office, main site or main facility of a commercial, non-profit or government entity. The satellite nodes 104 may be local networks located at or associated with local offices, sites or facilities of the same commercial, non-profit or government entity as the master node 102. Alternatively, the master node 102 may, for example, be a document storage facility of a first entity (e.g., business), while the satellite nodes may be associated with offices or facilities of a second entity (e.g., business) which relies on the first entity to manage the electronic or digital documents or files of the second entity. For instance, the master node 102 may be operated by a first entity that provides document management services such as storage, replication or backup to various other business entities. The satellite nodes may be offices, sites or facilities of another business entity which has hired the first entity to provide document management services. Other arrangements are possible, for example where the satellite nodes 104 are offices, sites or facilities of two or more entities. Thus, the networked electronic document management environment 100 may include computer systems owned, operated by or for, or otherwise associated with a single entity or various different entities.

Electronic or digital documents or files are created at the satellite nodes 104, and/or optionally at the master node 102. As discussed herein, many of the electronic or digital documents or files created at the satellite nodes 104 may be stored or otherwise replicated at the master node 102. Such may provide backup storage of the electronic or digital documents or files. As also discussed herein, such may also allow various satellite nodes 104 to access electronic or digital documents or files owned by other satellite nodes. As further discussed herein, some of the electronic or digital documents or files may be stored only locally, by the satellite nodes. Such may provide flexibility to allow satellite nodes to configure the operation of the document management environment 100.

Electronic or digital documents or files may be owned by a satellite node 104, or possibly by the master node 102. Ownership is a logical construct which allows a specific user or users, or other entity (e.g., office, site or facility), to interact with or otherwise perform actions on one or more electronic or digital documents or files, and/or to grant rights, permissions, privileges or authority to other entities to interact with or otherwise perform actions with respect to one or more electronic or digital documents or files. Ownership will typically initially reside with the user or other entity that creates the electronic or digital document or file or with the node associated with or at which the electronic or digital document or file is created. An owner will typically have the rights, permission, privilege or authority to change the ownership of one or more electronic or digital documents or files to another entity.

At times it may be necessary or desirable to share some or all of the electronic or digital documents or files between one or more of the satellite nodes. Sharing the electronic or digital documents or files may include allowing interactions with such file for example, viewing, modifying, copying, annotating, importing, and/or deleting. Additionally, or alternatively, if may be desirable to change ownership for one or more of the electronic or digital documents or files. The terms electronic and digital are used interchangeably herein and in the claims. For example, such terms are used to modify the noun document, to indicate a set of data that is in a format suitable for use by a processor-based device, for storage in computer- or processor-readable form, or for transmission via a communications network. As used herein and in the claims, the term document includes single page or multiple page documents, whether in the form of a text or alphanumeric based binary file (e.g., ASCII, or .doc, .docx, .xlb file extensions), in the form of an image (e.g., binary image, vector based image, Portable Data File or PDF®) of a text, alphanumeric or graphic based document, or in the form of a markup language based file (e.g., HTML, XML).

The satellite nodes 104 may be geographically distant from one another. One or more of the satellite nodes 104 may be geographically distant from the master node 102. Thus, the master node 102 and satellite nodes 104 may be communicatively coupled as a wide area network (WAN). For example, the master node 102 and satellite nodes 104 may be communicatively coupled in a hub and spoke network system, for example as illustrated in FIG. 1 by the double headed arrows. The master node 102 and satellite nodes 104 may be communicatively coupled via one or more wired (e.g., electrical conductors, optical fiber) and/or wireless networks or communications channels, for example an intranet, an extranet or some other network infrastructure employing wired (e.g., electrical conductors, optical fiber) or wireless communications media.

The master node 102 includes one or more master node server computer systems 106. The master node server computer system 106 may be operated via a user interface, for example a user interface provide by one or more displays 108, keyboards 110 and/or pointer devices 112, and a graphical user interface or command line interface (not shown). The master node 102 may include a common electronic document repository 114 to store electronic or digital documents or files. As used herein and in the claims, the term common electronic document repository means electronic or digital document or file storage media which is shared by two or more networked nodes, such as two or more networked satellite nodes 104 or a networked satellite node 104 and master node 102, and hence is common to at least two network nodes. The common electronic document repository 114 may be implemented in one or more computer- or processor-readable storage media (e.g., write once read many). The common electronic document repository 114 may include one or more databases which state information or data regarding the electronic or digital documents or files. Such database(s) may be stored separately from the electronic or digital documents, for example, on storage medium that may be rewritten many times (e.g., hard drive, RAID, RAM). The common electronic document repository 114 may be co-located with the master node server computer system 106, for example in the same room, building or facility. Alternatively, the common electronic document repository 114 may be located remotely from the master node server computer system 106, for example in a different facility, city, state or country.

In some embodiment, the master node 102 may include additional networked computer systems (not shown) which produce documents requiring storage. In such embodiments, the master node 102 may optionally include a local document repository 116 to store electronic or digital documents or files. As explained in more detail herein, the local document repository 116 may store electronic or digital documents or files created or owned by the networked computer systems which are local to or part of the master node 102. Such computer systems may, for example, be communicatively coupled by one or more local area networks (LANs), which may be wired (e.g., electrical conductor(s), optical fiber) and/or wireless.

The satellite nodes 104 may each include one or more satellite node server computers systems 120a-120c (collectively 120). The satellite node server computer system 120 may be operated via a user interface, for example a user interface provided by a display 122 (only one called out), keyboard 124 (only one called out) and/or pointer device 126 (only one called out), and a graphical user interface or command line interface (not shown).

The satellite nodes 104 may each include additional networked computer systems 130 which produce documents requiring storage, and which may optionally be shared with other computer systems of the respective satellite node 104 or other satellite nodes 104. Such computer systems 130 may, for example, be communicatively coupled by one or more local area networks (LANs), which may be wired (e.g., electrical conductor(s), optical fiber) and/or wireless.

In such embodiments, the satellite nodes 104 may each include a local document repository 132a-132c (collectively 132) to store electronic or digital documents or files. As used herein and in the claims, the term local document repository means electronic or digital document or file storage media which is shared by a single network of, such as two or more networked computer systems 130 at a satellite office, site or facility, and hence is local to that satellite office, site or facility. As explained in more detail herein, the local document repository 132 may store electronic or digital documents or files created or owned by the networked computer systems 130 which are local to, or part of, the respective satellite node 104. Each of the local document repositories 132 may be implemented in one or more computer- or processor-readable storage media. Local document repositories may include one or more databases which store information or data about the electronic or digital documents stored locally. Such database (s) may be stored separately from the electronic or digital documents, for example, a storage media that may be rewritten many times (e.g., hard drives, RAID, RAM). The local document repository 132 may be co-located with the respective satellite node server computer system 120, for example in the same room, building or facility. Alternatively, the local document repository 132 may be located remotely from the satellite node server computer system 120, for example in a different facility, city, state or country.

Ownership information for all electronic or digital documents or files is stored at the master node 102 in one or more databases. This not only includes ownership information for all electronic or digital documents or files stored or replicated in the common electronic document repository 114, but also ownership information for electronic or digital documents or files which are not stored or replicated in the common electronic document repository 114 which are only stored or replicated in respective ones of the local document repositories 116 and 132. The ownership information may inherently or explicitly indicate a location or logical address at which the electronic or digital documents or files are stored. For example, the ownership information may include a field or pointer to a field that stores a logical address of the location of the respective electronic or digital document or file. Also for example, if a given electronic or digital document or file is not stored in the common electronic document repository 114, the system may infer that the given electronic or digital document or file is stored in the local document repository 116 or 132 associated with the owner of the given electronic or digital document or file, for instance the satellite node that is currently identified as the owner of the electronic or digital document or file.

While FIG. 1 illustrates a representative networked electronic or digital document management environment 100, typical networked electronic or digital document management environment may include many additional computer systems and entities. The concepts taught herein may be employed in a similar fashion with more populated networked electronic or digital document management environments.

Figure 2:
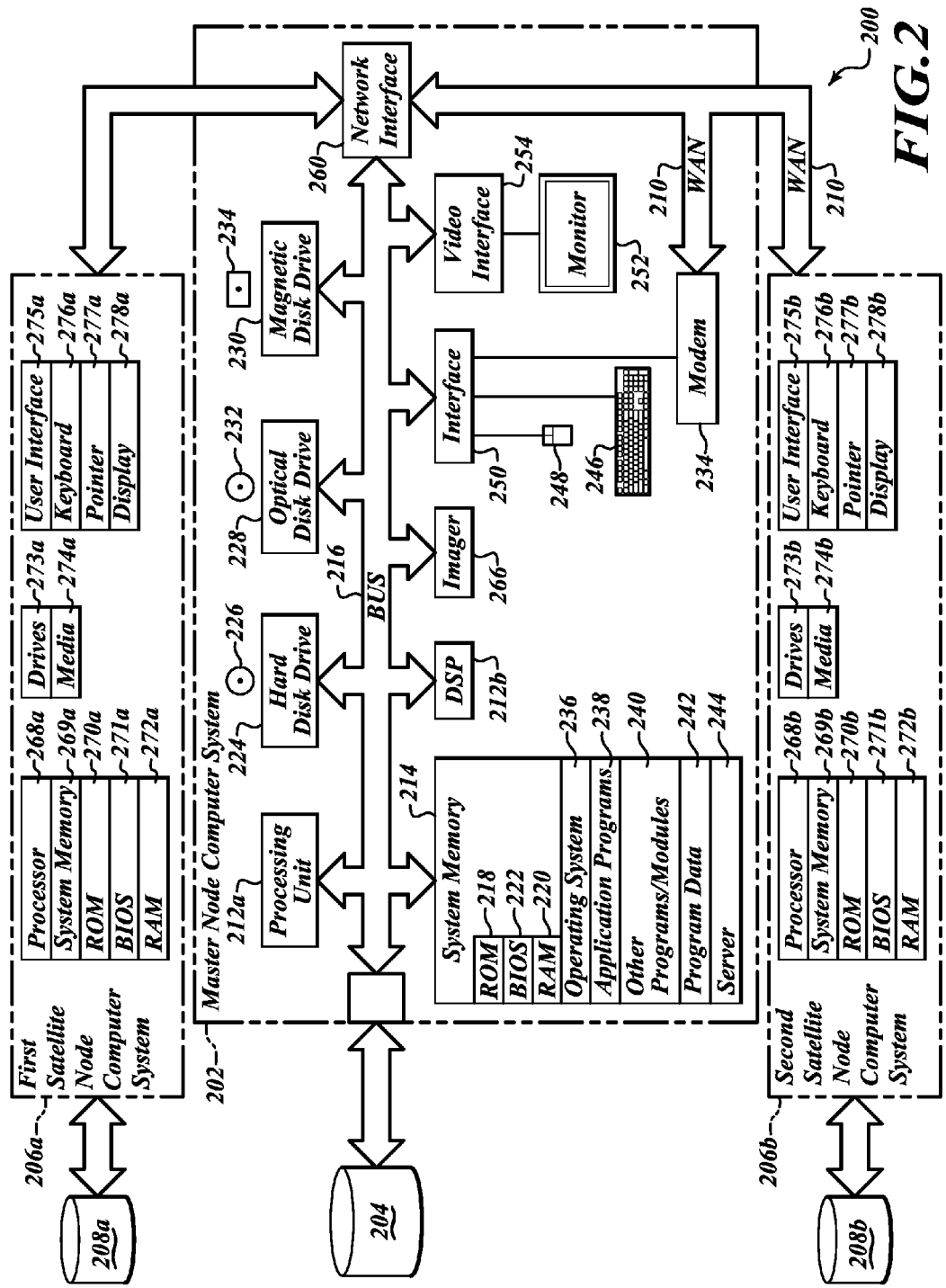
FIG. 2 is a functional block diagram of a networked document management environment according to one illustrated embodiment, illustrating various components of the master node and satellite nodes.

FIG. 2 and the following discussion provide a brief, general description of a suitable networked electronic or digital document management environment 200 in which the various illustrated embodiments can be implemented. Although not required, the embodiments will be described in the general context of computer-executable instructions, such as program application modules, objects, or macros stored on computer- or processor-readable media and executed by a computer or processor. Those skilled in the relevant art will appreciate that the illustrated embodiments, as well as other embodiments, can be practiced with other system configurations and/or other computing system configurations, including hand-held devices, multiprocessor systems, microprocessor-based or programmable consumer electronics, personal computers ("PCs"), network PCs, mini computers, mainframe computers, and the like. The embodiments can be practiced in distributed computing environments where tasks or modules are performed by remote processing devices, which are linked through a communications network. In a distributed computing environment, program modules may be located in both local and remote memory storage devices or media.

FIG. 2 shows a networked electronic or digital document management environment 200 comprising one or more master node server computer systems 202 (only one illustrated) and one or more common electronic document repositories 204 (only one illustrated). The common electronic document repository 204 is communicatively coupled to the master node server computer systems 202 via one or more communications channels, for example on or more parallel cables, serial cables, or wireless channels capable of high speed communications, for instance via Firewire®.

The networked electronic or digital document management environment 200 also comprises one or more satellite node server computer systems 206a, 206b (collectively 206, only two illustrated) and one or more local electronic document repositories 208a, 208b (collectively 208, only two illustrated). The local electronic document repository 208 is communicatively coupled to the respective satellite node server computer system 206 via one or more communications channels, for example on or more parallel cables, serial cables, or wireless channels capable of high speed communications, for instance via Firewire®.

The satellite node server computer systems 206 are communicatively coupled to the master node server computer system 202 by one or more communications channels, for example one or more wide area networks (WANs) 210. In operation, the satellite node server computer systems 206 typically function as a server to other computer systems (i.e., clients) associated with a respective satellite node, and also function as a client of the master node server computer system 202. In operation, the master node server computer system 202 typically functions as a server with respect to the satellite node server computer systems 206.

The networked electronic or digital document management environment 200 may employ other computer systems and network equipment, for example additional servers, proxy servers, firewalls, routers and/or bridges. The master node server computer system 202 will at times be referred to in the singular herein, but this is not intended to limit the embodiments to a single device since in typical embodiments, there may be more than one master node server computer system 202 involved. Unless described otherwise, the construction and operation of the various blocks shown in FIG. 2 are of conventional design. As a result, such blocks need not be described in further detail herein, as they will be understood by those skilled in the relevant art.

The master node server computer system 202 may include one or more processing units 212a, 212b (collectively 212), a system memory 214 and a system bus 216 that couples various system components including the system memory 214 to the processing units 212. The processing units 212 may be any logic processing unit, such as one or more central processing units (CPUs) 212a, digital signal processors (DSPs) 212b, application-specific integrated circuits (ASICs), field programmable gate arrays (FPGAs), etc. The system bus 216 can employ any known bus structures or architectures, including a memory bus with memory controller, a peripheral bus, and/or a local bus. The system memory 214 includes read-only memory ("ROM") 218 and random access memory ("RAM") 220. A basic input/output system ("BIOS") 222, which can form part of the ROM 218, contains basic routines that help transfer information between elements within the master node server computer system 202, such as during start-up.

The master node server computer system 202 may include a hard disk drive 224 for reading from and writing to a hard disk 226, an optical disk drive 228 for reading from and writing to removable optical disks 232, and/or a magnetic disk drive 230 for reading from and writing to magnetic disks 234. The optical disk 232 can be a CD-ROM, while the magnetic disk 234 can be a magnetic floppy disk or diskette. The hard disk drive 224, optical disk drive 228 and magnetic disk drive 230 may communicate with the processing unit 212 via the system bus 216. The hard disk drive 224, optical disk drive 228 and magnetic disk drive 230 may include interfaces or controllers (not shown) coupled between such drives and the system bus 216, as is known by those skilled in the relevant art. The drives 224, 228 and 230, and their associated computer-readable media 226, 232, 234, provide nonvolatile storage of computer readable instructions, data structures, program modules and other data for the master node server computer system 202. Although the depicted master node server computer system 202 is illustrated employing a hard disk 224, optical disk 228 and magnetic disk 230, those skilled in the relevant art will appreciate that other types of computer-readable media that can store data accessible by a computer may be employed, such as WORM drives, RAID drives, magnetic cassettes, flash memory cards, digital video disks ("DVD"), Bernoulli cartridges, RAMs, ROMs, smart cards, etc.

Program modules can be stored in the system memory 214, such as an operating system 236, one or more application programs 238, other programs or modules 240 and program data 242. Application programs 238 may include instructions that cause the processor(s) 212 to automatically replicate electronic or digital documents or files or changes thereto to the common electronic document repository 204. Application programs 238 may include instructions that cause the processor(s) 212 to automatically transfer or otherwise provide access to replicated electronic or digital documents or files to satellite nodes. Application programs 238 may include instructions that cause the processor(s) 212 to automatically establish, maintain, update or record ownership information with respect to electronic or digital documents or files, as well as privileges, permissions or authorizations to perform various acts on such electronic or digital documents or files such as reading, modifying, annotating, importing, and/or deleting. Application programs 238 may include instructions that cause the processor(s) 212 to poll the satellite nodes for new electronic or digital documents or files or changes made thereto. Such may be performed periodically or from time-to-time in a non-periodic fashion and/or in response to a satellite node coming back online or otherwise reestablishing communications with the master node after loss of communications. Alternatively, the master node may rely on the satellite nodes to push new electronic or digital documents or files or changes thereto to the master node. Application programs 238 may even further include instructions to create entries in and/or such or query one or more databases which store information or data about the electronic or digital documents or files, whether such are replicated at the common electronic document repository or are stored only locally at the local document repositories without replication to the common electronic document repository. Other program modules 240 may include instructions for handling security such as password or other access protection and communications encryption. The system memory 214 may also include communications programs for example a server 244 that causes the master node server computer system 202 to serve electronic or digital documents or files via corporate intranets, extranets, or other networks as described below. The server 244 in the depicted embodiment is markup language based, such as Hypertext Markup Language (HTML), Extensible Markup Language (XML) or Wireless Markup Language (WML), and operates with markup languages that use syntactically delimited characters added to the data of a document to represent the structure of the document. A number of suitable servers may be commercially available such as those from Mozilla, Google, Microsoft and Apple Computer.

While shown in FIG. 2 as being stored in the system memory 214, the operating system 236, application programs 238, other programs/modules 240, program data 242 and browser 244 can be stored on the hard disk 226 of the hard disk drive 224, the optical disk 232 of the optical disk drive 228 and/or the magnetic disk 234 of the magnetic disk drive 230.

An operator can enter commands and information into the master node server computer system 202 through input devices such as a touch screen or keyboard 246 and/or a pointing device such as a mouse 248, and/or via a graphical user interface. Other input devices can include a microphone, joystick, game pad, tablet, scanner, etc. These and other input devices are connected to one or more of the processing units 212 through an interface 250 such as a serial port interface that couples to the system bus 216, although other interfaces such as a parallel port, a game port or a wireless interface or a universal serial bus ("USB") can be used. A monitor 252 or other display device is coupled to the system bus 216 via a video interface 254, such as a video adapter. The master node server computer system 202 can include other output devices, such as speakers, printers, etc.

The master node server computer system 202 can operate in a networked environment using logical connections to one or more remote computers and/or devices. For example, the master node server computer system 202 can operate in a networked environment using logical connections to one or more satellite node server computer systems 206a, 206b. Communications may be via a wired and/or wireless network architecture, for instance wired and wireless enterprise-wide computer networks, intranets, extranets, and/or the Internet. Other embodiments may include other types of communication networks including telecommunications networks, cellular networks, paging networks, and other mobile networks. There may be any variety of computers, switching devices, routers, bridges, firewalls and other devices in the communications paths between the master node server computer system 202 and the satellite node server computer systems 206a, 206b.

The satellite node server computer systems 206 will typically take the form of a server computer that servers one or more client computers at a satellite office, site or facility. The satellite node server computer systems 206 may take the form of a conventional mainframe computer, mini-computer, workstation computer, personal computer (desktop or laptop), or handheld computer executing appropriate instructions. For instance, the satellite node server computer system 206 may execute a set of server instructions to function as a server for a number of computer systems (i.e., clients) communicatively coupled via a LAN at a satellite facility or site. Additionally, the satellite node server computer system 206 may also execute a set of client instructions to function as a client of the master node server computer system 202, communicatively coupled thereto via a WAN.

The satellite node server computer systems 206 may include one or more processing units 268a, 268b (collectively 268), system memories 269a, 269b (collectively 269) and a system bus (not shown) that couples various system components including the system memory 269 to the processing unit 268. The satellite node server computer systems 206 will at times be referred to in the singular herein, but this is not intended to limit the embodiments to a single satellite node server computer systems 206 since in typical embodiments, there may be more than one satellite node server computer systems 206 or other device involved per satellite node. Non-limiting examples of commercially available computer systems include, but are not limited to, an 80x86 or Pentium series microprocessor from Intel Corporation, U.S.A., a PowerPC microprocessor from IBM, a Sparc microprocessor from Sun Microsystems, Inc., a PA-RISC series microprocessor from Hewlett-Packard Company, or a 68xxx series microprocessor from Motorola Corporation.

The processing unit 268 may be any logic processing unit, such as one or more central processing units (CPUs), digital signal processors (DSPs), application-specific integrated circuits (ASICs), field programmable gate arrays (FPGAs), etc. Unless described otherwise, the construction and operation of the various blocks of the satellite node server computer systems 206 shown in FIG. 2 are of conventional design. As a result, such blocks need not be described in further detail herein, as they will be understood by those skilled in the relevant art.

The system bus can employ any known bus structures or architectures, including a memory bus with memory controller, a peripheral bus, and a local bus. The system memory 269 includes read-only memory ("ROM") 270a, 270b (collectively 270) and random access memory ("RAM") 272a, 272b (collectively 272). A basic input/output system ("BIOS") 271a, 271b (collectively 271), which can form part of the ROM 270, contains basic routines that help transfer information between elements within the satellite node server computer systems 206, such as during start-up.

The satellite node server computer systems 206 may also include one or more media drives 273a, 274b (collectively 274), e.g., a hard disk drive, magnetic disk drive, WORM drive, and/or optical disk drive, for reading from and writing to computer-readable storage media 274a 274b (collectively 274), e.g., hard disk, optical disks, and/or magnetic disks. The computer-readable storage media 274 may, for example, take the form of removable media. For example, hard disks may take the form of a Winchester drives, optical disks can take the form of CD-ROMs, while magnetic disks can take the form of magnetic floppy disks or diskettes. The media drive(s) 273 communicate with the processing unit 268 via one or more system buses. The media drives 273 may include interfaces or controllers (not shown) coupled between such drives and the system bus, as is known by those skilled in the relevant art. The media drives 273, and their associated computer-readable storage media 274, provide nonvolatile storage of computer readable instructions, data structures, program modules and other data for the satellite node server computer systems 206. Although described as employing computer-readable storage media 274 such as hard disks, optical disks and magnetic disks, those skilled in the relevant art will appreciate that satellite node server computer systems 206 may employ other types of computer-readable storage media that can store data accessible by a computer, such as magnetic cassettes, flash memory cards, digital video disks ("DVD"), Bernoulli cartridges, RAMs, ROMs, smart cards, etc. Data or information, for example, electronic or digital documents or files or data (e.g., metadata, ownership, authorizations) related to such can be stored in the computer-readable storage media 274.

Program modules, such as an operating system, one or more application programs, other programs or modules and program data, can be stored in the system memory 269. Program modules may include instructions for storing certain or selected electronic or digital documents or files or changes thereto to the common electronic document repository 204. Storage or replication to the common electronic document repository 204 may be the default mode, option or configuration. Storage or replication may be periodic, or non-periodic, for instance upon closing or saving of an electronic or digital document or file. The instructions may cause the satellite node to push new electronic or digital documents or files to the master node or push changes to existing electronic or digital documents or files to the master node. Such push operation may be responsive to polling performed by the master node or may be responsive to an action at the satellite node, such as the saving or closing of an electronic or digital document or file. Alternatively, the instructions may cause the satellite node to allow the master node to retrieve new electronic or digital documents or files or changes to existing electronic or digital documents or files. Program modules may include instructions for storing certain or selected other ones of the electronic or digital documents or files to the respective local electronic document repository 208 without replication to the common electronic document repository. Such may include electronic or digital documents or files identified by a user for only local storage or local replication. Program modules may additionally include instructions for handling security such as ownership, password or other access protection and communications encryption. In particular, the system memory 269 may include communications programs that permit the satellite node server computer system 206 to retrieve electronic or digital documents or files from the common electronic document repository 204. The system memory 269 may additionally include communications programs that permit the satellite node server computer system 206 to gain access to or retrieve electronic or digital documents or files from the local electronic document repository 204 of another satellite node, via the master node server computer system 202, if the requesting satellite node server computer system 206 has sufficient right, permission, privilege or authority. The system memory 269 may also include other communications programs, for example a Web client or browser that permits the satellite node server computer systems 206 to access and exchange data with sources such as Web sites of the Internet, corporate intranets, extranets, or other networks. The browser may, for example be markup language based, such as Hypertext Markup Language (HTML), Extensible Markup Language (XML) or Wireless Markup Language (WML), and may operate with markup languages that use syntactically delimited characters added to the data of a document to represent the structure of the document.

While described as being stored in the system memory 269, the operating system, application programs, other programs/modules, program data and/or browser can be stored on the computer-readable storage media 274 of the media drive(s) 273. An operator can enter commands and information into the satellite node server computer system 206 via a user interface 275a, 275b (collectively 275) through input devices such as a touch screen or keyboard 276a, 276b (collectively 276) and/or a pointing device 277a, 277b (collectively 277) such as a mouse. Other input devices can include a microphone, joystick, game pad, tablet, scanner, etc. These and other input devices are connected to the processing unit 269 through an interface such as a serial port interface that couples to the system bus, although other interfaces such as a parallel port, a game port or a wireless interface or a universal serial bus ("USB") can be used. A display or monitor 278a, 278b (collectively 278) may be coupled to the system bus via a video interface, such as a video adapter. The satellite node server computer system 206 can include other output devices, such as speakers, printers, etc.

Figure 3:
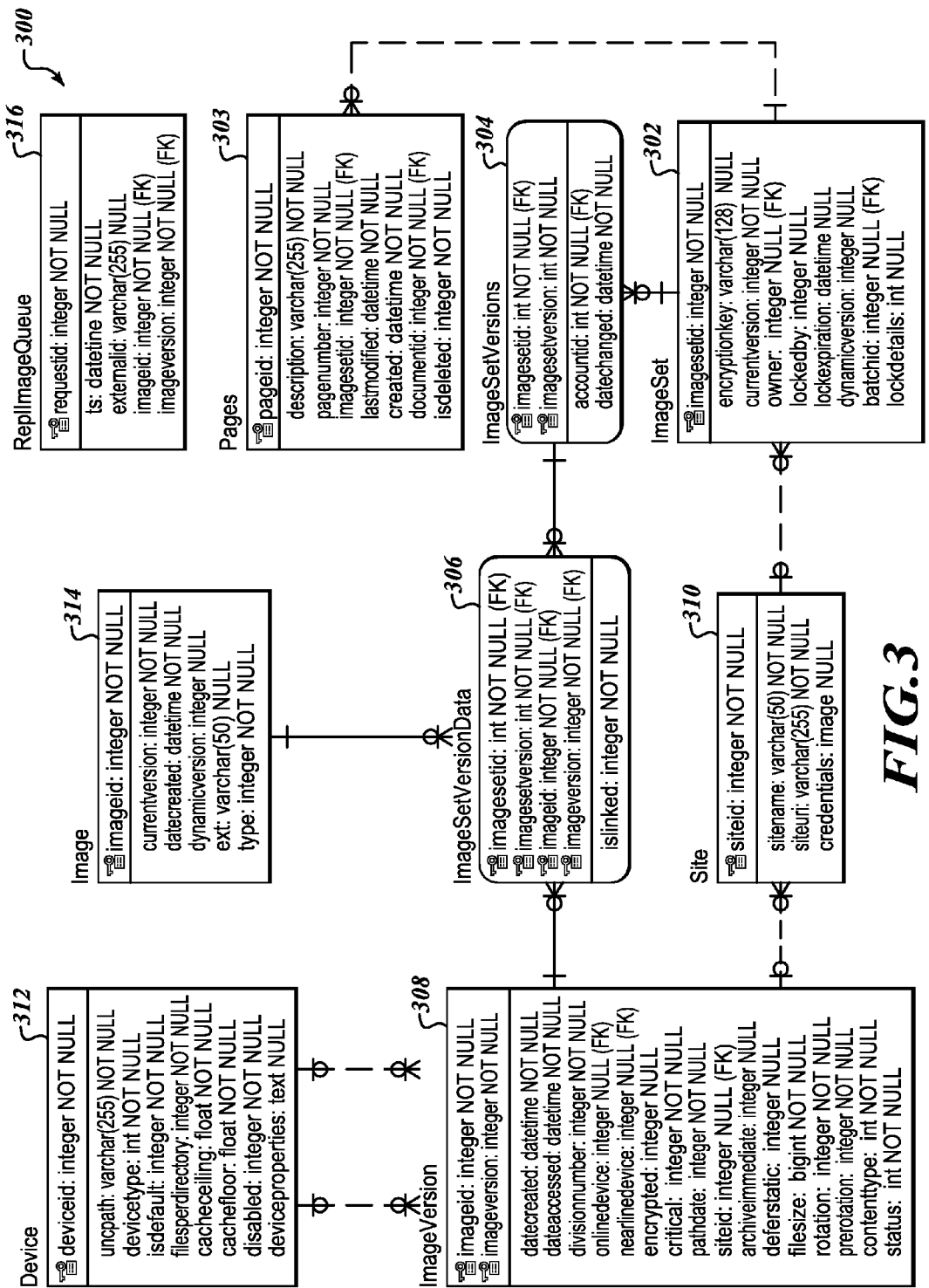
FIG. 3 is a schematic diagram of a database schema according to one illustrated embodiment.

FIG. 3 shows a database schema 300 according to one illustrated embodiment. The illustrated database schema 300 may be suitable for use in a document management system in which some documents are replicated to a common electronic document repository while other documents are stored at local satellite nodes without replication to the common electronic document repository. Other database schemas may be suitable. The database schema 300 may be implemented in one or more computer- or processor-readable storage media, by operation of one or more processor that execute suitable instructions.

An exemplary method of operation will now be described, with reference to the illustrated database schema of FIG. 3.

A client application, for example executing on a client computer of a satellite node, passes binary data (e.g., image(s)) to a satellite application server (e.g., executing on satellite node server computer) that is configured with a master backed primary storage device (e.g., WORM drive). The binary data is associated with a document page create request generated on by the client computer of the satellite node. The satellite application server causes the data to be stored on the primary storage device and creates a set of entries related to the binary data in a database implemented in one or more storage media.

In particular, the satellite application server causes creation of an ImageSet entry 302 in the database. The ImageSet entry 302 may be a record, table, or other data structure that provides a link between a document page and associated version of the binary data (e.g., image(s)). The ImageSet entry 302 may also provide an indication of an owner (e.g., office, site or facility or satellite node) that owns the particular document page. The ImageSet entry 302 may store an encryption key. The ImageSet entry 302 may further provide or implement a lock mechanism to prevent or allow updates to the document page data. The lock mechanism may include an indication of who locked the image, an expiration date and/or time for the lock, and/or details regarding the lock.

The satellite application server may also cause creation of an ImageSetVersions entry 304 in the database. The ImageSetVersions entry 304 may be a record, table, or other data structure that provides persistence for all versions (i.e., past and present) of image sets that have been associated with the document page. Such may include information or data about the image set version, the account identifier that created the image set version, and a date of the most recent change.

The satellite application server may also cause creation of an ImageSetVersionData entry 306 in the database. ImageSetVersionData entry 306 may be a record, table, or other data structure which provides information or data about the specific image(s) included in an ImageSet version entry 304. Such information or data may, for example, include an image identifier, image version number or identifier, and/or a link indicator that indicates if the specific image is linked to another ImageSet version entry 304.

The satellite application server may additionally cause creation of an ImageVersion entry 308 in the database. ImageVersion entry 308 may be a record, table, or other data structure that includes information or data specific to an image that is part of a given ImageSet version entry 304. The information or data may, for example, include an image identifier (i.e., imageid) that uniquely identifies an image and an image version identifier (i.e., imageversion) that uniquely identifies a version of the image. The information or data may also identify the date and/or time the version was created (i.e., datecreated) and/or date or time the version was accessed (i.e., dateaccessed). The information or data may indicate whether the version is encrypted (i.e., encrypted). The information or data may further describe which primary or cache storage device or storage medium the image resides on (i.e., onlinedevice, nearline device), specification of a path on the device(s) (i.e., pathdate, siteid), file size (i.e., filesize), and/or other image metadata (e.g., rotation, prerotation, contenttype, status). For images that reside on master backed primary storage devices (e.g., WORM drives), this record or table may also include a replication availability indicator which indicates whether an image is available for replication.

The satellite application server may additionally cause creation of a Site entry 310 in the database, if not already existing. The Site entry 310 may be a record, table or other data structure that includes information or data specific to identify an official site, or facility, for instance a satellite node, master node or some other specific logical or physical location. The satellite application server may thus associate a specific image with a specific site, via a site identifier (i.e., siteid) stored in the ImageVersion entry 308. The site entry may include information such as a site identifier (i.e., siteid) and site name (i.e., sitename).

The satellite application server may additionally cause creation of a Device entry 312 in the database, if not already existing. The Device entry 312 may be a record, table or other data structure that includes information or data specific to a storage device, for instance a storage device or medium located at a satellite node or the master node. The satellite application server may thus associate a specific image version with a specific storage device, via a device identifier (i.e., deviceid) stored stored in the ImageVersion entry 308. The Device entry 312 may include additional information or data about the particular storage device, for instance, device type (i.e., devicetype), cache ceiling (i.e., cacheceiling), cache floor (i.e., cachefloor), an indication of file per directory (i.e., filesperdirectory), and/or device properties (i.e., deviceproperties).

The satellite application server may further cause creation of an Image entry 314. The Image entry 314 may be a record, table or other data structure that includes information or data about an image. The information or data may, for example, include a current version indication (i.e., currentversion) indicative of a current version, a creation date indication (i.e., datecreated) indicative of a date on which the version was created, an extension (i.e., ext) indicative of an extension, and/or a type (i.e., type) indicative of a type associated with the image.

The satellite application server may further cause creation of an ReplImageQueue entry 312. The ReplImageQueue entry may be a record, table or other data structure which includes information or data related to a replication request. Such information or data may, for example, include a replication request identifier (i.e., requestid), external identifier (i.e., externalid), timestamp (i.e., ts), image identifier (i.e., imageid), and or image version value (i.e., imageversion).

The replication process replicates both structure data and image data to the master site asynchronously. Image replication to the master site is performed independently of the data that represents the structure of the page. The page data replication process will create placeholder records in the ImageSet, ImageSetVersions, ImageSetVersionData, ImageVersion and Image records or tables in the master database if the image replication has not previously completed. In this scenario the placeholder records will be updated with actual image information during the image replication process.

Upon completion of the replication process the ReplImageQueue record is removed and the "Available for replication" indicator in the ImageVersion record or table is updated.

Figure 4:
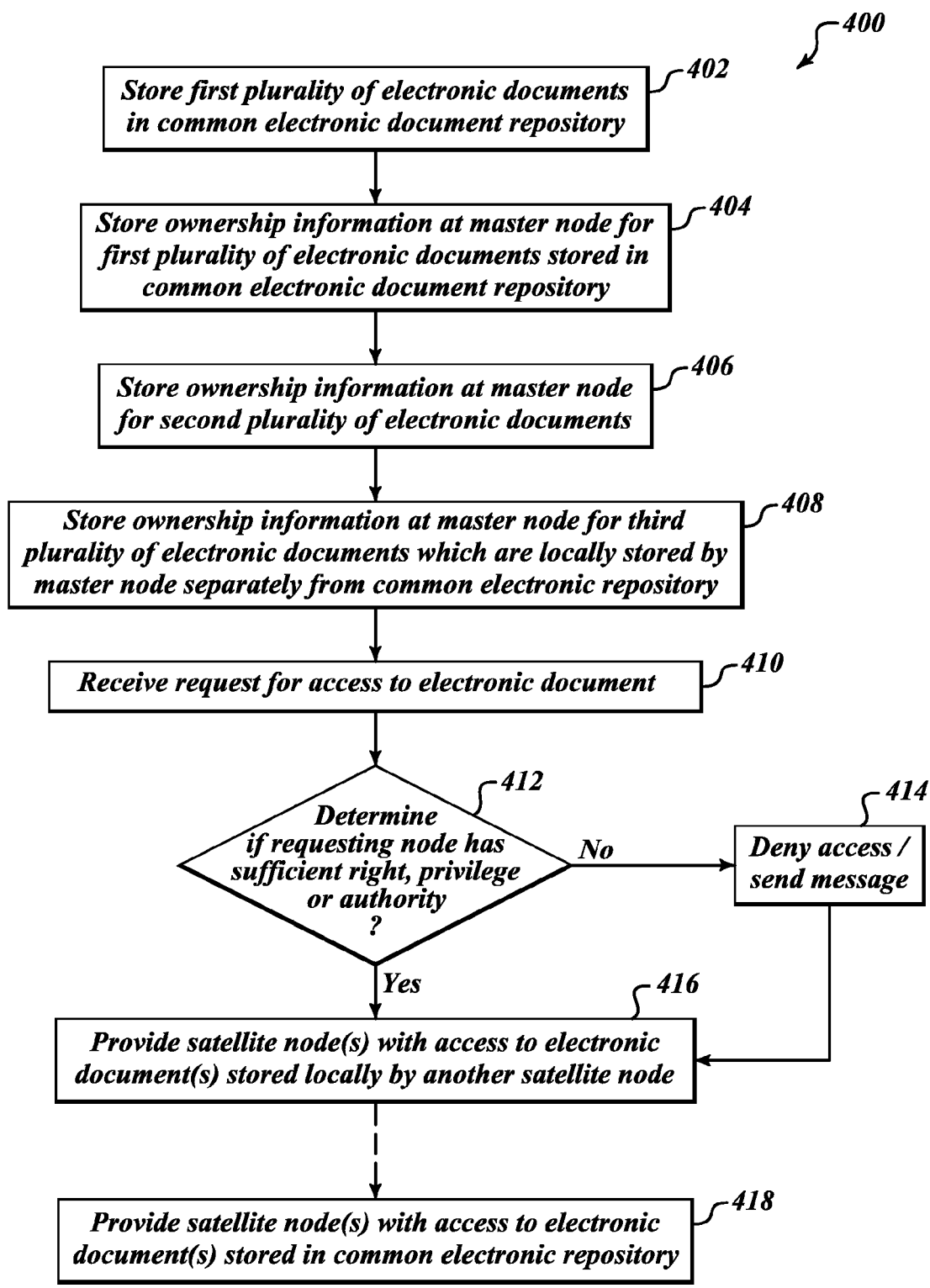
FIG. 4 is a flow diagram showing a method of operating a master node server computer system to manage electronic documents shared across networked satellite nodes remotely located from one another, according to one illustrated embodiment.

FIG. 4 shows method 400 of operating a master node server computer system to manage electronic documents shared across networked satellite nodes remotely located from one another, according to one illustrated embodiment.

At 402, a master node server computer system stores or replicates a first plurality of electronic documents in a common electronic document repository. The first plurality of electronic documents includes electronic documents owned by at least two different owners, the owners remotely located from one another. For example, the owners may be two or more different satellite nodes, which are associated with respective offices, sites or facilities which offices, sites or facilities are remotely located from one another. The common electronic document repository may include one or more storage media which may, for example, be co-located with the master node server computer system. The master node server computer system may store or replicate the electronic documents in response to requests from one or more satellite node server computer systems. Those requests may be pushed to the master node server computer system from the satellite node computer systems. Alternatively, the master node server computer system may poll the satellite node computer systems. Entire electronic documents may be replicated or simply changes to the electronic documents. Such replication may, for example, be performed at a page level, or alternatively at some other level for example at a document, folder or directory level.

At 404, the master node server computer system stores ownership information at the master node for the first plurality of electronic documents stored in the common electronic document repository. The ownership information indicates that at least one of the electronic documents of the first plurality of electronic documents is owned by a first owner of the at least two different owners. The ownership information also indicates that at least one of the electronic documents of the first plurality of electronic documents is owned by a second owner of the at least two different owners. The second owner is different from, and remotely located with respect to, the first owner.

At 406, the master node server computer system stores ownership information at the master node for a second plurality of electronic documents. The second plurality of electronic documents are locally stored by at least one satellite node at a respective location remote from the common electronic repository, and such electronic documents are not replicated to the common electronic document repository. The ownership information stored at the master node for the first and the second plurality of electronic documents indicates for each electronic document a logical entity that has the right, permission, privilege or authority to perform actions on the respective electronic document(s), as well as to authorize other entities to perform actions on the respective electronic document(s). The satellite node may indicate which files to replicate in the common electronic document repository and which to not replicate using a flag or other suitable identifier. Alternatively, the satellite node may send replication requests or push only those documents intended to be replicated to the master node server computer system.

At 408, the master node server computer system may store ownership information at the master node for a third plurality of electronic documents. The third plurality of electronic documents are electronic documents that are locally stored at master node in a local storage medium or repository, that is separate from the common electronic repository. Such may facilitate embodiments where the master node is implemented at a main or central office, site or facility which has its own LAN and clients and, hence, a need to cache electronic documents. In other embodiments, electronic or digital documents may not be stored locally at the master node, and hence no storing of such ownership information would occur.

At 410, the master node server computer system receives a request for access to one or more electronic document(s), for example from one of the satellite nodes. The request may originate with a client computer system at one of the satellite nodes, and may be relayed to the master node server computer system via a satellite node server computer system. Alternatively, the request may originate with a satellite node server computer system. The request may be for one or more of read access, write or modify access, annotation access, import access or even delete access.

At 412, the master node server computer system determines whether the requester (e.g., requesting satellite node) has sufficient right, permission, privilege or authority for the requested access. For example, the master node server computer system may query the database 300 (FIG. 3).

If the requester does not have sufficient right, permission, privilege or authority for the requested level of access, the master node server computer system denies the requester access at 414. The master node server computer system may optionally provide a suitable message to the requester indicating that the requester does not have sufficient rights, permissions, privilege or authority as part of denying access. Optionally, the master node server computer system may additionally or alternatively provide an indication of the attempted access to the owner of the electronic document and/or to a system administrator computer system.

If the requester has sufficient rights, permissions, privilege or authority, the master node server computer system provides the requester with the requested access to the electronic document. For example, at 416 the master node server computer system provides at least one satellite node with access to at least one electronic document that is stored locally by another satellite node. Also for example, at 418 the master node server computer system provides at least one satellite node with access to at least one electronic document that is stored in the common electronic document repository, which electronic document is owned by another satellite node.

The method 400 may terminate until called again. Alternatively, the method 400 may run concurrently with other methods or processes, for example as one of multiple threads on a multi-threaded processor system.

Thus, the master node server computer system may provide access without regard to whether the requested electronic document resides in the common electronic document repository or resides only locally at a local document repository of either one of the satellite nodes or the master node. Such increases the flexibility of satellite offices, sites and facilities to manage electronic or digital documents or files.

FIG. 5 shows a method 500 of storing ownership information at the master node for a second plurality of electronic documents which are locally stored by at least one satellite node at a respective location remote from the common electronic repository, according to one illustrated embodiment. The method 500 may be used in addition to, or as part of, the method 400 (FIG. 4).

At 502, the master node server computer system may store ownership information at the master node for the second plurality of electronic documents which are locally stored by a first and at least a second satellite node at a first and a second location, respectively, the first and the second locations located remotely from one another. Thus, the master node server computer system may track information for electronic or digital documents or files stored locally at two or more satellite nodes.

FIG. 6 shows a method 600 of providing access to a requested electronic or digital document or file, according to one illustrated embodiment. The method 600 may be used in addition to, or as part of, the method 400 (FIG. 4).

At 602, the master node server computer system receives a request at the master node for a specific electronic document from a first satellite node.

At 604, the master node server computer system determines a location of the requested specific electronic document. For example, the master node server computer system may query the database 300 (FIG. 3).

At 606, the master node server computer system provides the first satellite node with access to the specific electronic document that is stored locally by a second satellite node remote from the first satellite node and remote from the common electronic document repository. Thus, the master node server computer system may allow one satellite to access electronic or digital documents or files stored locally by another satellite node.

FIG. 7 shows a method 700 of providing access to a requested electronic or digital document or file, according to one illustrated embodiment. The method 700 may be used in addition to, or as part of, the method 400 (FIG. 4).

At 702, the master node server computer system receives a request at the master node for a specific electronic document from a first satellite node.

At 704, the master node server computer system determines a location of the requested specific electronic document. For example, the master node server computer system may query the database 300 (FIG. 3).

At 706, the master node server computer system provides the first satellite node with an instance of the specific electronic document that is stored locally by a second satellite node remote from the first satellite node and remote from the common electronic document repository. Thus, the master node server computer system may provide one satellite with an instance of an electronic or digital documents or files stored locally by another satellite node.

Figure 8:
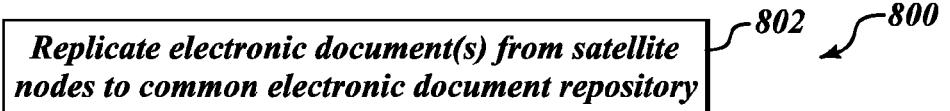
FIG. 8 is a flow diagram showing a method of storing electronic or digital documents or files in a common electronic document repository, according to one illustrated embodiment.

FIG. 8 shows a method 800 of storing a first plurality of electronic or digital documents or files in a common electronic document repository, according to one illustrated embodiment. The method may be used in addition to, or as part of, the method 400 (FIG. 4).

At 802, the master node server computer system replicates a number of electronic documents from the satellite nodes to the common electronic document repository. Replication may include storing or replicating binary data that represents the electronic or digital document or file. For example, an instance or copy of the electronic or digital document or file may by saved or replicated to the common electronic repository, for instance on a page by page basis. Replication may also include creating and/or updating data structures in the database 300 (FIG. 3) to reflect the replication or replicated electronic or digital documents or files.

Figure 9:
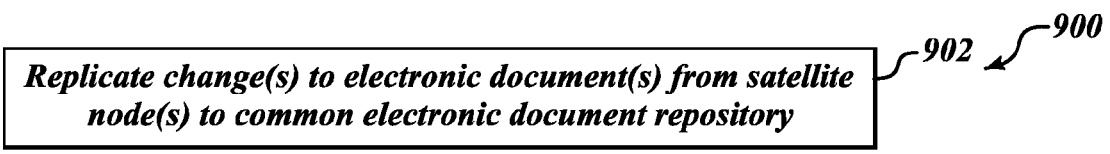
FIG. 9 is a flow diagram showing a method of storing electronic or digital documents or files in a common electronic document repository, according to one illustrated embodiment.

FIG. 9 shows a method 900 of storing a first plurality of electronic or digital documents or files in a common electronic document repository, according to one illustrated embodiment. The method may be used in addition to, or as part of, the method 400 (FIG. 4).

At 902, the master node server computer system replicates at least one change to at least one of the electronic documents from at least one of the satellite nodes to the common electronic document repository. Replication may include storing or replicating binary data that represents changes made to the electronic or digital document or file. For example, an instance or copy of changes made to the electronic or digital document or file may by saved or replicated to the common electronic repository, for instance on a change by change basis or on a page by page basis. Replication may also include creating and/or updating data structures in the database 300 (FIG. 3) to reflect the changes made to the electronic or digital documents or files. Such may advantageously eliminate the need to store or replicate entire electronic or digital documents or files.

Figure 10:
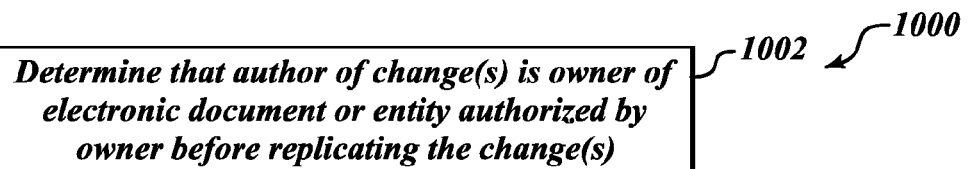
FIG. 10 is a flow diagram showing a method of storing electronic or digital documents or files in a common electronic document repository, according to one illustrated embodiment.

FIG. 10 shows a method 1000 of storing a first plurality of electronic or digital documents or files in a common electronic document repository, according to one illustrated embodiment. The method may be used in addition to, or as part of, the method 400 (FIG. 4).

At 1002, the master node server computer system determines that an author of the change(s) is at least one of the owner of the electronic document or an authorized entity that has been granted the right, permission, privilege or authority by the owner of the electronic document before replicating the at least one change. For example, the master node server computer system may query the database 300 (FIG. 3).

Figure 11:
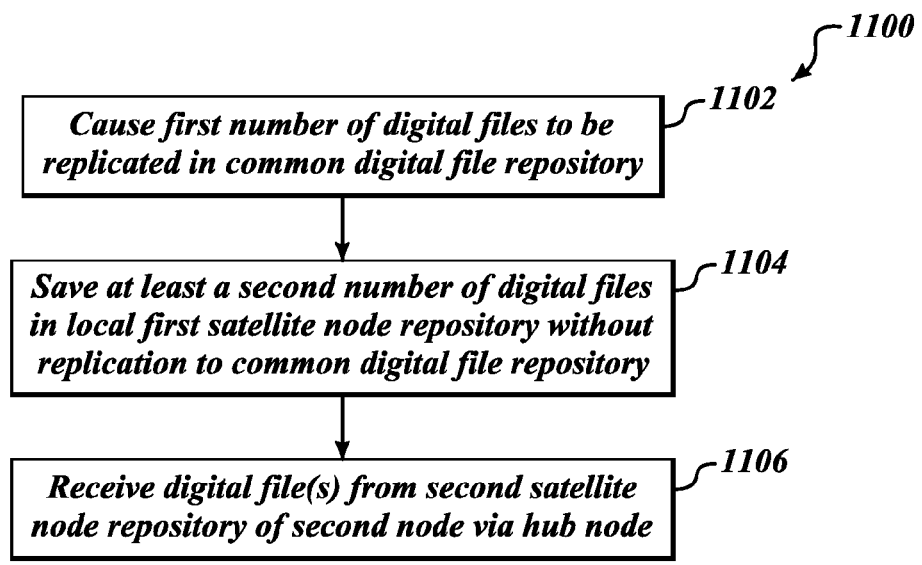
FIG. 11 is a flow diagram showing a method of operating a satellite node computer system to manage electronic documents shared across networked satellite nodes remotely located from one another, according to one illustrated embodiment.

FIG. 11 shows method 1100 of operating a satellite node computer system to manage electronic documents shared across networked satellite nodes remotely located from one another, according to another illustrated embodiment.

At 1102, the satellite node computer system causes at least a first number of electronic or digital documents or files to be replicated in a common digital file repository which includes digital files from at least one other satellite node. For example, the satellite node computer system may push the electronic or digital documents or files to the master node server computer system. Alternatively or additionally, the satellite node computer system may send requests to the master node server computer system. Such pushing or requests may occur periodically or may occur in response to an occurrence of some action or event. For instance, such pushing or requests may occur upon creation of a new electronic or digital document or file, a change made to an electronic or digital document or file, a saving of an electronic or digital document or file or a closing of an electronic or digital document or file. Pushing may also occur in response to a request from the master node server computer system, such as a polling of the satellite nodes performed by the master node server computer system.

At 1104, the satellite node computer system saves at least a second number of digital files in a local first satellite node repository without replication to the common electronic or digital file repository. Such saving may periodic or may be in response to an occurrence of some action or event. For instance, such local saving may occur upon creation of a new electronic or digital document or file, a change made to an electronic or digital document or file, a saving of an electronic or digital document or file or a closing of an electronic or digital document or file.

At 1106, the satellite node computer system receives at least one electronic or digital document or file from a second satellite node electronic or digital document repository of a second node of the networked hub and node system, which has not been replicated to the common electronic or digital document repository. The electronic or digital document or may be received via a hub node of the networked hub and spoke system. For example, such may be received via a master node server computer system.

Figure 12:
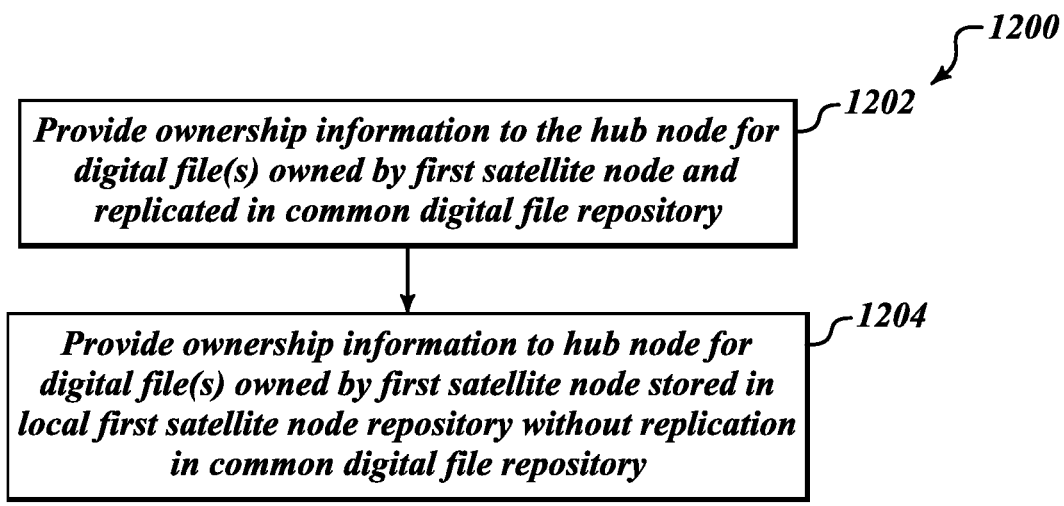
FIG. 12 is a flow diagram showing a method of operating a satellite node to manage electronic or digital documents or files, according to one illustrated embodiment.

FIG. 12 shows a method 1200 of operating a satellite node to manage electronic or digital documents or files, according to one illustrated embodiment. The method 1200 may be used in addition to, or as part of, the method 1100 (FIG. 11).

At 1202, the satellite node computer system provides ownership information to the hub node of the networked hub and spoke system for a number of digital files owned by the first satellite node of the networked hub and spoke system and replicated in the common electronic or digital document repository.

At 1204, the satellite node computer system provides ownership information to the hub node of the networked hub and spoke system for a number of digital files owned by the first satellite node of the networked hub and spoke system and stored in the local first satellite node electronic or digital document repository without replication in the common electronic or digital document repository.

Thus, the satellite node computer system ensures that the master node has information for the replicated files, as well as files that are only stored locally without replication to the common electronic or digital document repository.

Figure 13:
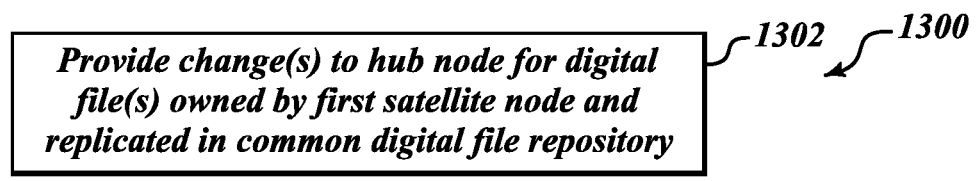
FIG. 13 is a flow diagram showing a method of operating a satellite node to manage electronic or digital documents or files, according to one illustrated embodiment.

FIG. 13 shows a method 1300 of operating a satellite node to manage electronic or digital documents or files, according to one illustrated embodiment. The method 1300 may be used in addition to, or as part of, the method 1100 (FIG. 11).

At 1302, the satellite node computer system provides at least one change to the hub node of the networked hub and spoke system for one of the electronic or digital documents or files owned by the first satellite node of the networked hub and spoke system and replicated in the common electronic or digital document repository.

Figure 14:
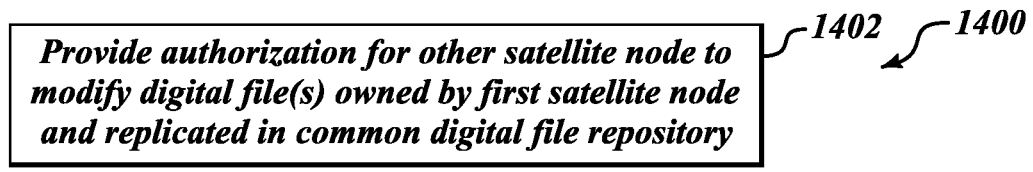
FIG. 14 is a flow diagram showing a method of operating a satellite node to manage electronic or digital documents or files, according to one illustrated embodiment.

FIG. 14 shows a method 1400 of operating a satellite node to manage electronic or digital documents or files, according to one illustrated embodiment. The method 1400 may be used in addition to, or as part of the method 1100 (FIG. 11).

At 1402, the satellite node computer system provides authorization for at least one other satellite node to modify one of the digital files owned by the first satellite node of the networked hub and spoke system and replicated in the common electronic or digital document repository.

Figure 15:
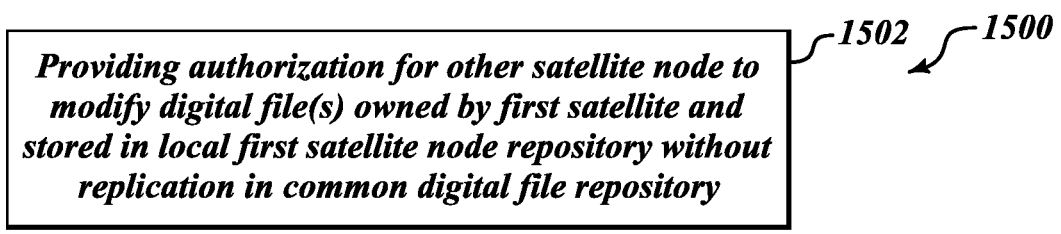
FIG. 15 is a flow diagram showing a method of operating a satellite node to manage electronic or digital documents or files, according to one illustrated embodiment.

FIG. 15 shows a method 1500 of operating a satellite node to manage electronic or digital documents or files, according to one illustrated embodiment. The method 1500 may be used in addition to, or as part of the method 1100 (FIG. 11).

At 1502, the satellite node computer system provides authorization for at least one other satellite node to modify one of the digital files owned by the first satellite node of the networked hub and spoke system and stored in the local first satellite node electronic or digital document repository without replication in the common electronic or digital document repository.

Figure 16:
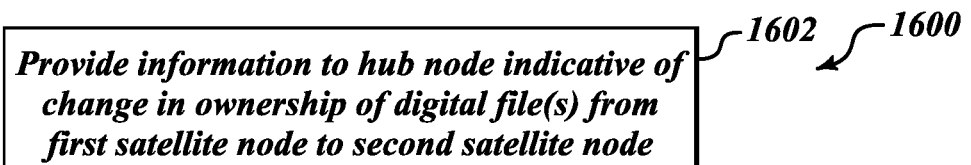
FIG. 16 is a flow diagram showing a method of operating a satellite node to manage electronic or digital documents or files, according to one illustrated embodiment.

FIG. 16 shows a method 1600 of operating a satellite node to manage electronic or digital documents or files, according to one illustrated embodiment. The method 1600 may be used in addition to, or as part of, the method 1100 (FIG. 11).

At 1602, the satellite node computer system provides information to the hub node of the networked hub and spoke system indicating a change in ownership of one of the digital files from the first satellite node to the second satellite node of the networked hub and spoke system.

The described apparatus, methods and articles can manage electronic or digital documents or files in a flexible manner, allowing satellite nodes to locally store some documents or files without replication and to "commonly" store other files via replication to a master node, while allowing seamless access without regard to whether a document or file has been replicated or not.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of managing electronic documents shared across networked satellite nodes remotely located from one another, the method comprising:
storing a first plurality of electronic documents in a common electronic document repository, wherein the first plurality of electronic documents includes electronic documents owned by at least two different owners remotely located from one another;
storing ownership information at a master node for the first plurality of electronic documents stored in the common electronic document repository, wherein the ownership information indicates that at least one of the electronic documents of the first plurality of electronic documents is owned by a first owner of the at least two different owners and at least one of the electronic documents of the first plurality of electronic documents is owned by a second owner of the at least two different owners, the second owner different from and remotely located with respect to the first owner; and
storing ownership information at the master node for a second plurality of electronic documents which are locally stored by at least one satellite node at a respective location remote from the common electronic document repository, wherein the second plurality of electronic documents are not stored in the common electronic document repository, and
wherein the ownership information stored at the master node for the first and the second plurality of electronic documents indicates for each electronic document a logical entity that has authority to authorize changes to the respective electronic document.

2. The method of claim 1 wherein storing ownership information at the master node for a second plurality of electronic documents which are locally stored by at least one satellite node at a respective location remote from the common electronic document repository includes storing ownership information at the master node for the second plurality of electronic documents which are locally stored by a first and at least a second satellite node at a first and at least a second location, respectively, the first and the at least second locations located remotely from one another.

3. The method of claim 1, further comprising:
storing ownership information at the master node for a third plurality of electronic documents which are locally stored by the master node separately from the common electronic document repository.

4. The method of claim 1, further comprising:
receiving a request at the master node for a specific electronic document from a first satellite node;
determining a location of the requested specific electronic document; and
providing the first satellite node with a copy of the specific electronic document that is stored locally by a second satellite node remote from the first satellite node and remote from the common electronic document repository.

5. The method of claim 1 wherein storing a first plurality of electronic documents in a common electronic document repository includes replicating a number of electronic documents from the networked satellite nodes to the common electronic document repository, and wherein the second plurality of electronic documents which are locally stored by at least one satellite node at a respective location remote from the common electronic document repository are stored without replication to the common electronic document repository.

6. The method of claim 1 wherein storing a first plurality of electronic documents in a common electronic document repository includes replicating at least one change to at least one of the electronic documents from at least one of the networked satellite nodes to the common electronic document repository, and wherein the second plurality of electronic documents which are locally stored by at least one satellite node at a respective location remote from the common electronic document repository are stored without replication to the common electronic document repository.

7. The method of claim 6, further comprising:
determining that an author of the at least one change is at least one of an owner of the changed electronic document or an authorized entity that has been authorized by the owner of the changed electronic document before replicating the at least one change.

8. A method of managing electronic documents shared across networked satellite nodes remotely located from one another, the method comprising:
storing a first plurality of electronic documents in a common electronic document repository, wherein the first plurality of electronic documents includes electronic documents owned by at least two different owners remotely located from one another;
storing ownership information at a master node for the first plurality of electronic documents stored in the common electronic document repository, wherein the ownership information indicates that at least one of the electronic documents of the first plurality of electronic documents is owned by a first owner of the at least two different owners and at least one of the electronic documents of the first plurality of electronic documents is owned by a second owner of the at least two different owners, the second owner different from and remotely located with respect to the first owner;
storing ownership information at the master node for a second plurality of electronic documents which are locally stored by at least one satellite node at a respective location remote from the common electronic document repository, wherein the ownership information stored at the master node for the first and second plurality of electronic documents indicates for each electronic document a logical entity that has authority to authorize changes to the respective electronic document; and providing at least one satellite node with access to at least one electronic document that is stored locally by another satellite node.

9. The method of claim 8 wherein storing a first plurality of electronic documents in a common electronic document repository includes replicating a number of electronic documents from the networked satellite nodes to the common electronic document repository.

10. The method of claim 8 wherein storing a first plurality of electronic documents in a common electronic document repository includes replicating at least one change to at least one of the electronic documents from at least one of the networked satellite nodes to the common electronic document repository.

11. The method of claim 10, further comprising:
determining that an author of the at least one change is at least one of an owner of the changed electronic document or an authorized entity that has been authorized by the owner of the changed electronic document before replicating the at least one change.

12. A method of managing electronic documents shared across networked satellite nodes remotely located from one another, the method comprising:
storing a first plurality of electronic documents in a common electronic document repository, wherein the first plurality of electronic documents includes electronic documents owned by at least two different owners remotely located from one another;
storing ownership information at a master node for the first plurality of electronic documents stored in the common electronic document repository, wherein the ownership information indicates that at least one of the electronic documents of the first plurality of electronic documents is owned by a first owner of the at least two different owners and at least one of the electronic documents of the first plurality of electronic documents is owned by a second owner of the at least two different owners, the second owner different from and remotely located with respect to the first owner;
storing ownership information at the master node for a second plurality of electronic documents which are locally stored by at least one satellite node at a respective location remote from the common electronic document repository, wherein the ownership information stored at the master node for the first and the second plurality of electronic documents indicates for each electronic document a logical entity that has authority to authorize changes to the respective electronic document;
receiving a request at the master node for a specific electronic document from a first satellite node;
determining a location of the requested specific electronic document; and
providing the first satellite node with access to the specific electronic document that is stored locally by a second satellite node remote from the first satellite node and remote from the common electronic document repository.

13. The method of claim 12 wherein storing a first plurality of electronic documents in a common electronic document repository includes replicating a number of electronic documents from the networked satellite nodes to the common electronic document repository.

14. The method of claim 12 wherein storing a first plurality of electronic documents in a common electronic document repository includes replicating at least one change to at least one of the electronic documents from at least one of the networked satellite nodes to the common electronic document repository.

15. The method of claim 14, further comprising:
determining that an author of the at least one change is at least one of an owner of the changed electronic document or an authorized entity that has been authorized by the owner of the changed electronic document before replicating the at least one change.

\* \* \* \* \*